United States Patent
Jung et al.

(10) Patent No.: US 10,251,179 B2
(45) Date of Patent: Apr. 2, 2019

(54) METHOD AND APPARATUS FOR COMMUNICATING DATA BETWEEN STATION AND NEIGHBOR ACCESS POINT IN COMMUNICATION SYSTEM

(71) Applicant: Samsung Electronics Co., Ltd., Suwon-si, Gyeonggi-do (KR)

(72) Inventors: Byoung-Hoon Jung, Seoul (KR); Hyun-Jeong Kang, Seoul (KR); O-Hyun Jo, Seoul (KR); Sang-Hyun Chang, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 247 days.

(21) Appl. No.: 14/955,655

(22) Filed: Dec. 1, 2015

(65) Prior Publication Data

US 2016/0156392 A1 Jun. 2, 2016

(30) Foreign Application Priority Data

Dec. 1, 2014 (KR) .................. 10-2014-0169709

(51) Int. Cl.
*H04W 72/04* (2009.01)
*H04W 8/24* (2009.01)
(Continued)

(52) U.S. Cl.
CPC .......... *H04W 72/048* (2013.01); *H04W 8/24* (2013.01); *H04W 8/245* (2013.01); *H04W 48/16* (2013.01); *H04W 84/12* (2013.01)

(58) Field of Classification Search
CPC ....... H04W 84/12; H04W 48/16; H04W 8/22; H04W 72/044; H04W 72/048; H04W 8/24; H04W 8/245; H04W 48/18; H04W 72/04
(Continued)

(56) References Cited

U.S. PATENT DOCUMENTS 9,743,407 B2 * 8/2017 Cordeiro .......... H04W 72/0453
2004/0053615 A1 * 3/2004 Kim, II ................. H04W 36/30
455/436

(Continued)

FOREIGN PATENT DOCUMENTS

KR 10-2006-0087839 A 8/2006

*Primary Examiner* — Rownak Islam
(74) *Attorney, Agent, or Firm* — Jefferson IP Law, LLP

(57) ABSTRACT

The present disclosure relates to 5th generation (5G) or pre-5G communication systems to support a higher data rate than the long term evolution (LTE) or other 4th generation (4G) communication systems. A method for transmitting data in a communication system is provided. The method includes identifying, by a station (STA) communicating with a first access point (AP), a resource for performing communication with a second AP positioned adjacent to the STA based on information regarding a capability of the STA, performing the communication with the second AP using the resource, and transmitting data obtained by performing the communication with the second AP to the first AP. The information regarding the capability includes one of information regarding multiple antennas available on the STA, information regarding a base-band processing unit including the multiple antennas, or information regarding a modem including the multiple antennas and the base-band processing unit.

20 Claims, 17 Drawing Sheets

(51) Int. Cl.
*H04W 48/16* (2009.01)
*H04W 84/12* (2009.01)

(58) Field of Classification Search
USPC .......................................................... 370/338
See application file for complete search history.

(56) References Cited

U.S. PATENT DOCUMENTS

| | | | |
|---|---|---|---|
| 2005/0239510 A1* | 10/2005 | Cho | H04B 7/022 |
| | | | 455/562.1 |
| 2006/0025128 A1* | 2/2006 | Lee | H04W 36/0083 |
| | | | 455/432.1 |
| 2006/0251025 A1 | 11/2006 | Kwon et al. | |
| 2008/0298445 A1* | 12/2008 | Richardson | H04B 7/0491 |
| | | | 375/224 |
| 2013/0059581 A1* | 3/2013 | Sebire | H04W 48/02 |
| | | | 455/434 |
| 2014/0064229 A1* | 3/2014 | Lee | H04W 48/16 |
| | | | 370/329 |
| 2014/0194116 A1 | 7/2014 | Jalloul et al. | |
| 2014/0241307 A1* | 8/2014 | Liu | H04B 7/0617 |
| | | | 370/329 |
| 2016/0323853 A1* | 11/2016 | Kim | H04W 72/12 |

\* cited by examiner

| Element ID | Length | TXOP 1 Start time | TXOP 1 duration | ... | TXOP n Start time | TXOP n duration |

FIG.21A

| Element ID | Length | RSSI Info |

FIG.21B

| Element ID | Length | Sector (beam) Select | Antenna Select | SNR Report (Optional) |

FIG.21C

| Element (Info. Gathering Indication) | Length | # of Surplus Antennas | # of Surplus RF chains | # of Surplus Modems | Info Gathering Time | STA→AP Info Scheduling (Time/Freq) |
| --- | --- | --- | --- | --- | --- | --- |
| <1 octet> | <1 octet> | <2~3bits> | <2~3bits> | <1~2bits> | <1 octet> | Variable |

FIG.22

METHOD AND APPARATUS FOR COMMUNICATING DATA BETWEEN STATION AND NEIGHBOR ACCESS POINT IN COMMUNICATION SYSTEM

CROSS-REFERENCE TO RELATED APPLICATION(S)

This application claims the benefit under 35 U.S.C. § 119(a) of a Korean patent application filed on Dec. 1, 2014 in the Korean Intellectual Property Office and assigned Serial number 10-2014-0169709, the entire disclosure of which is hereby incorporated by reference.

TECHNICAL FIELD

The present disclosure relates to methods and apparatuses for communicating data between a station (STA) and a neighbor access point (AP) in a wireless local area network (WLAN) supportive of a multi-antenna transmission scheme.

BACKGROUND

In order to meet a demand for wireless data traffic soring since a 4th generation (4G) communication system came to market, there are ongoing efforts to develop enhanced 5th generation (5G) communication systems or pre-5G communication systems. For the reasons, the 5G communication system or pre-5G communication system is called a beyond 4G network communication system or a post long term evolution (LTE) system.

For higher data rates, the 5G communication systems are considered to be implemented on ultra-high frequency bands (mmWave), such as, for example, 60 GHz. To mitigate pathloss on the ultra-high frequency band and increase the reach of radio waves, the following techniques are taken into account for the 5G communication system: beamforming, massive multi-input multi-output (MIMO), full dimensional MIMO (FD-MIMO), array antenna, analog beamforming, and a large scale antenna.

Also being developed are various technologies for the 5G communication system to have an enhanced network, such as evolved or advanced small cell, a cloud radio access network (cloud RAN), an ultra-dense network, a device-to-device (D2D) communication, a wireless backhaul, a moving network, a cooperative communication, coordinated multi-point (CoMP), and an interference cancellation.

There are also other various schemes under development for the 5G system including, for example, hybrid frequency shift keying (FSK) and quadrature amplitude modulation (FQAM) and sliding window superposition coding (SWSC), which are advanced coding modulation (ACM) schemes, and filter bank multi-carrier (FBMC), non-orthogonal multiple access (NOMA) and sparse code multiple access (SCMA), which are advanced access schemes.

Communication systems are evolving to support a higher data rate to meet the demand for steadily increasing radio data traffic. For example, communication systems are in development to have enhanced spectral efficiency and increased channel capability based on a diversity of schemes including MIMO and the orthogonal frequency division multiplexing (OFDM) to increase the data rate.

As an example, the wireless local area network (WLAN) system adopts the multiple user-MIMO (MU-MIMO) scheme that enables sharing by multiple users and multiple antennas in order to support high-volume data services.

A soring number of stations (STAs) and users' demand for access to wireless networks led to an overlapped basic service sets (OBSS) environment, where multiple STAs and access points (APs) co-exist in one area. Under such an environment, the density of STAs and APs increases over time.

For instance, the number of STAs in a WLAN adopting the WLAN system is predicted to drastically grow as the D2D communication comes in commercial use.

Pursuant to the institute of electrical and electronics engineers (IEEE) 802.11-based medium access control (MAC) protocol which operates in a contention-based manner, simultaneous transmission of two or more signals at a particular time is deemed as a collision. For that reason, different APs and STAs using the same channel occupy and use the channel through mutual contention.

Under the OBSS environment, many STAs and APs use the same channel and are thus highly likely to collide. Further, such OBSS environment significantly worsens the hidden node problem that out-of-sensing coverage STAs attempt signal transmission without caring about each other and the exposed node problem that too many STAs are present in sensing coverage and are thus reluctant to make a transmission attempt. Accordingly, the overall network performance may be deteriorated.

In response, a research effort is underway via IEEE 802.11 to standardize schemes to mitigate inter-BSS interference while attaining an enhanced performance by varying the parameters of each BSS, such as, for example, sensing power, channel, transmit power, or beamforming direction, under the environment (i.e., OBSS environment) where different WLANs (BSSs) using the same channel overlap one another.

The architecture of a general WLAN system supportive of multiple antennas is now described with reference to FIG. 1.

FIG. 1 is a view schematically illustrating a structure of a general WLAN system supportive of multiple antennas according to the related art.

Referring to FIG. 1, a WLAN system includes multiple APs, for example, three APs including an AP#1 111, an AP#2, 121, and an AP#3 131, and multiple STAs, for example, nine STAs including an STA#1 113, an STA#2 115, an STA#3 117, an STA#4 123, an STA#5 125, an STA#6 127, an STA#7 133, an STA#8 133, an STA#8 135, and an STA#9 137.

The STA#1 113, the STA#2 115, and the STA#3 117 are connected with the AP#1 111 to form a BSS. The STA#4 123, the STA#5 125, and the STA#6 127 are connected with the AP#2 121 to form another BSS. The STA#7 133, the STA#8 135, and the STA#9 137 are connected with the AP#3 131 to form a BSS.

The STAs and the APs, if necessary, send signals when the number of slots where the channel is in an idle state is not less than a threshold number of slots. In the WLAN system, both uplink and downlink are implemented based on a contention-based scheme.

Accordingly, when a collision occurs on the uplink and downlink, the STAs and the APs perform a backoff operation in which they wait until the number of slots where the channel is in the idle state becomes more than the threshold number of slots and then send corresponding signals.

The structure of an environment where WLAN systems supportive of the normal contention scheme co-exist overlaid has been described above in connection with FIG. 1.

In other words, as set forth above, when multiple BSSs are present overlaid, a collision or performance deterioration is highly likely to occur, resulting in lowered STA transmission efficiency and overall network throughput, as well as a service delay.

Thus, a need exists for network management schemes for reducing performance deterioration and service delay in the WLAN system supportive of the OBSS environment.

The above-described data is provided only as background data for a better understanding of the present disclosure. No determinations and claims are made as to whether what has been described in this section may be applicable as the prior art related to the present disclosure.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an apparatus and method for communicating data between neighbor wireless local area networks (WLANs) in a WLAN system supportive of multiple antennas.

Another aspect of the present disclosure is to provide a resource operating apparatus and method for preventing collision in a WLAN system supportive of multiple antennas.

Another aspect of the present disclosure is to provide a resource operating apparatus and method for reducing the service delay in a WLAN system supportive of multiple antennas.

Another aspect of the present disclosure is to provide a resource operating apparatus and method for increasing the radio resource efficacy in a WLAN system supportive of multiple antennas.

Another aspect of the present disclosure is to provide a resource operating apparatus and method for operating different antennas for different purposes and different methods in a WLAN system supportive of multiple antennas.

Another aspect of the present disclosure is to provide a resource operating apparatus and method for operating resources based on the number of antennas used by a signal transmitter in a WLAN system supportive of multiple antennas.

Another aspect of the present disclosure is to provide a resource operating apparatus and method for operating resources while varying the number of antennas used by a signal transmitter in a WLAN system supportive of multiple antennas.

In accordance with an aspect of the present disclosure, a method for transmitting data in a communication system is provided. The method includes identifying, by a station (STA) communicating with a first access point (AP), a resource for performing communication with a second AP positioned adjacent to the STA based on information regarding a capability of the STA, performing the communication with the second AP using the resource, and transmitting data obtained by performing the communication with the second AP to the first AP. The information regarding the capability includes one of information regarding multiple antennas available on the STA, information regarding a base-band processing unit including the multiple antennas, or information regarding a modem including the multiple antennas and the base-band processing unit.

In accordance with another aspect of the present disclosure, a method for receiving data in a communication system is provided. The method includes determining, by a first AP communicating with an STA, a resource for performing communication with a second AP positioned adjacent to the STA based on information regarding a capability of the STA and transmitting the information regarding the resource to the STA, and receiving, from the STA, data obtained from the second AP using the resource. The information regarding the capability includes one of information regarding multiple antennas available on the STA, information regarding a base-band processing unit including the multiple antennas, or information regarding a modem including the multiple antennas and the base-band processing unit.

In accordance with another aspect of the present disclosure, an apparatus for transmitting data in a communication system is provided. The apparatus includes a controller configured to perform control to identify, by an STA communicating with a first AP, a resource for performing communication with a second AP positioned adjacent to the STA based on information regarding a capability of the STA and perform communication with the second AP using the resource, and a transceiver configured to transmit data obtained by performing the communication with the second AP to the first AP. The information regarding the capability includes one of information regarding multiple antennas available on the STA, information regarding a base-band processing unit including the multiple antennas, or information regarding a modem including the multiple antennas and the base-band processing unit.

In accordance with another aspect of the present disclosure, an apparatus for receiving data in a communication system is provided. The apparatus includes a controller configured to determine, by a first AP communicating with an STA, a resource for performing communication with a second AP positioned adjacent to the STA based on information regarding a capability of the STA, and a transceiver configured to transmit the information regarding the resource to the STA and receive, from the STA, data obtained from the second AP using the resource. The information regarding the capability includes one of information regarding multiple antennas available on the STA, information regarding a base-band processing unit including the multiple antennas, or information regarding a modem including the multiple antennas and the base-band processing unit.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIGS. 20 to 21C are views schematically illustrating information elements containing data according to an embodiment of the present disclosure;

FIG. 22 is a view illustrating a structure of a neighbor AP information collecting request frame applied to a communication system according to an embodiment of the present disclosure;

Throughout the drawings, like reference numerals will be understood to refer to like parts, components, and structures.

DETAILED DESCRIPTION

Figure 1:
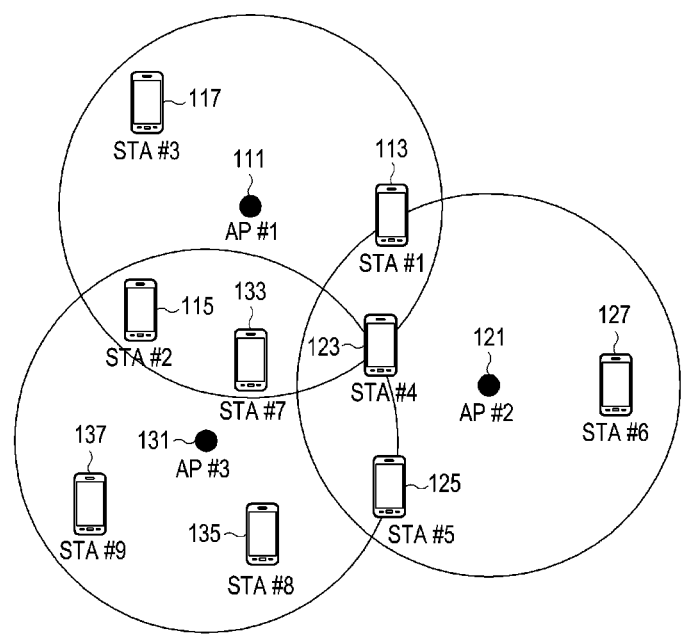
FIG. 1 is a view schematically illustrating a structure of a general wireless local area network (WLAN) system supportive of multiple antennas according to the related art.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of the limiting present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The terms coming with ordinal numbers such as 'first' and 'second' may be used to denote various components, but the components are not limited by the terms. The terms are used only to distinguish one component from another. For example, a first component may be denoted a second component, and vice versa without departing from the scope of the present disclosure. The term "and/or" may denote a combination(s) of a plurality of related items as listed or any of the items.

It will be further understood that the terms "comprise" and/or "have," when used in this specification, specify the presence of stated features, integers, operations, elements, and/or components, but do not preclude the presence or addition of one or more other features, integers, operations, elements, components, and/or groups thereof.

Prior to going into the detailed description of the disclosure, it might be effective to define particular words and phrases as used herein. As used herein, the terms "include" and "comprise" and their derivatives may mean doing so without any limitations. As used herein, the term "or" may mean "and/or." As used herein, the phrase "associated with" and "associated therewith" and their derivatives may mean "include," "be included within," "interconnect with," "contain," "be contained within," "connect to or with," "couple to or with," "be communicable with," "cooperate with," "interleave," "juxtapose," "be proximate to, "be bound to or with, "have, or "have a property of." As used herein, the term "controller" may mean any device, system, or part thereof controlling at least one operation. As used herein, the term "device" may be implemented in hardware, firmware, software, or some combinations of at least two thereof. It should be noted that functions, whatever particular controller is associated therewith, may be concentrated or distributed or implemented locally or remotely. It should be appreciated by one of ordinary skill in the art that the definitions of particular terms or phrases as used herein may be adopted for existing or future in many cases or even though not in most cases.

Unless otherwise defined in connection with embodiments of the present disclosure, all terms including technical and scientific terms used herein have the same meaning as commonly understood by one of ordinary skill in the art to which the embodiments of the present disclosure belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

According to an embodiment of the present disclosure, an electronic device as disclosed herein may include a communication function. For example, the electronic device may be a smartphone, a tablet personal computer (PC), a PC, a mobile phone, a video phone, an e-book reader, a desktop PC, a laptop PC, a netbook PC, a personal digital assistant (PDA), a portable multimedia player (PMP), a Moving Picture Experts Group phase 1 or phase 2 (MPEG-1 or MPEG-2) audio layer-3 (MP3) player, a mobile medical device, a camera, a wearable device (e.g., a head-mounted device (HMD)), electronic clothes, an electronic bracelet, an electronic necklace, an electronic appcessory, an electronic tattoo, or a smart watch.

According to various embodiments of the disclosure, the electronic device may be a smart home appliance with a communication function. For example, the smart home appliance may be a television, a digital versatile disc (DVD) player, an audio player, a refrigerator, an air conditioner, a vacuum cleaner, an oven, a microwave oven, a washer, a drier, an air cleaner, a set-top box, a television (TV) box (e.g., Samsung HomeSync™, Apple TV™, or Google TV™), a gaming console, an electronic dictionary, a camcorder, or an electronic picture frame.

According to various embodiments of the disclosure, the electronic device may be a medical device (e.g., magnetic resource angiography (MRA) device, a magnetic resource imaging (MRI) device, a computed tomography (CT) device, an imaging device, or an ultrasonic device), a navigation device, a global positioning system (GPS) receiver, an event data recorder (EDR), a flight data recorder (FDR), an automotive infotainment device, an sailing electronic device (e.g., a sailing navigation device, a gyroscope, or a compass), an aviation electronic device, a security device, or a robot for home or industry.

According to various embodiments of the disclosure, the electronic device may be part of furniture or building/structure with a communication function, an electronic board, an electronic signature receiving device, a projector, or various measurement devices (e.g., devices for measuring water, electricity, gas, or electromagnetic waves).

According to various embodiments of the disclosure, an electronic device may be a combination of the above-listed devices. It should be appreciated by one of ordinary skill in the art that the electronic device is not limited to the above-described devices.

According to an embodiment of the present disclosure, the station (STA) may be, for example, an electronic device.

According to various embodiments of the present disclosure, the STA may operate as, e.g., a signal transmitting device or a signal receiving device. For example, the access point (AP) may operate as, e.g., a signal transmitting device or a signal receiving device. According to an embodiment of the present disclosure the AP may operate as, for example, a resource operating device.

According to an embodiment of the present disclosure, there are proposed a resource operating apparatus and method in a wireless local area network (WLAN) system supportive of multiple antennas.

According to an embodiment of the present disclosure, there are proposed a resource operating apparatus and method for preventing collision in a WLAN system supportive of multiple antennas.

According to an embodiment of the present disclosure, there are proposed a resource operating apparatus and method for reducing the service delay in a WLAN system supportive of multiple antennas.

According to an embodiment of the present disclosure, there are proposed a resource operating apparatus and method for increasing the radio resource efficacy in a WLAN system supportive of multiple antennas.

According to an embodiment of the present disclosure, there are proposed a resource operating apparatus and method for operating resources based on the number of signal receivers that may request resource allocation in a WLAN system supportive of multiple antennas.

According to an embodiment of the present disclosure, there are proposed a resource operating apparatus and method for operating resources based on the number of antennas used by a signal transmitter in a WLAN system supportive of multiple antennas.

Methods and apparatuses as proposed according to embodiments of the present disclosure may apply to various communication systems, including institute of electrical and electronics engineers (IEEE) 802.11 communication systems, IEEE 802.16 communication systems, digital multimedia broadcasting (DMB) services, digital video broadcasting-handheld (DVP-H) and advanced television systems committee-mobile/handheld (ATSC-M/H) services or other mobile broadcasting services, internet protocol television (IPTV) services or other digital video broadcasting systems, MPEG media transport (MMT) systems, evolved packet systems (EPSs), long-term evolution (LTE) mobile communication systems, LTE-advanced (LTE-A) mobile communication systems, high speed downlink packet access (HSDPA) mobile communication systems, high speed uplink packet access (HSUPA) mobile communication systems, 3rd generation project partnership 2 (3GPP2) high rate packet data (HRPD) mobile communication systems, 3GPP2 wideband code division multiple access (WCDMA) mobile communication systems, 3GPP2 CDMA mobile communication systems, mobile IP systems, or so.

According to an embodiment of the present disclosure, a method for collecting data for operating a resource by a second device in a WLAN system supportive of multiple antennas includes determining whether there is a need of communicating data with a neighbor network, determining a resource to be used and an antenna operation method for transmitting data to the neighbor network using the multiple antennas, and communicating, by an STA, data with another STA (or an AP) of the neighbor network using the antennas and the resource, wherein the second device operates the resource using the communicated data.

According to an embodiment of the present disclosure, a method for collecting data for operating a resource by a second device in a WLAN system supportive of multiple antennas includes determining whether there is a need of communicating data with a neighbor network, determining a resource to be used and an antenna operation method for simultaneously communicating data with the neighbor network using multiple antennas unused for data transmission, a base-band processing unit including multiple antennas, or a modem including multiple antennas and a base-band processing unit, and communicating, by an STA, data with another STA (or an AP) of the neighbor network using the antennas, the base-band processing unit including the multiple antennas, or the modem including the multiple antennas and the base-band processing unit, wherein the second device operates the resource using the communicated data.

According to an embodiment of the present disclosure, a method for collecting data for operating a resource by a second device in a WLAN system supportive of multiple antennas includes determining whether there is a need of communicating data with a neighbor network, determining a particular time interval and determining a resource to be used and a method for operating an antenna, a base-band processing unit including the antenna, or a modem including multiple antennas and the base-band processing unit for communicating data with a neighbor network using multiple antennas unused for data transmission, a base-band processing unit including multiple antennas, or a modem including multiple antennas and a base-band processing unit during the determined time interval, and communicating, by an STA, data with another STA (or an AP) of the neighbor network using the antennas, the base-band processing unit including the multiple antennas, or the modem including the multiple antennas and the base-band processing unit, wherein the second device operates the resource using the communicated data.

According to an embodiment of the present disclosure, a method for collecting data for operating a resource by a second device in a WLAN system supportive of multiple antennas includes determining whether there is a need of communicating data with a neighbor network, determining a resource to be used and an antenna operation method for transmitting data to the neighbor network using multiple antennas unused for data transmission, a base-band processing unit including multiple antennas, or a modem including multiple antennas and a base-band processing unit, communicating, by an STA, data with another STA (or an AP) of the neighbor network using the antennas, the base-band processing unit including the multiple antennas, or the modem including the multiple antennas and the base-band processing unit and the resource, and providing the communicated data to a first device of a network where the second device belongs, wherein the first device operates the resource using the communicated data.

According to an embodiment of the present disclosure, a method for collecting data for operating a resource by a second device in a WLAN system supportive of multiple antennas includes determining whether there is a need of communicating data with a neighbor network, determining a resource to be used and an antenna operation method for transmitting data to the neighbor network using multiple antennas unused for data transmission, a base-band processing unit including multiple antennas, or a modem including multiple antennas and a base-band processing unit, communicating, by an STA, a probe request frame and a probe response frame with another STA (or an AP) of the neighbor network using the antennas, the base-band processing unit including the multiple antennas, or the modem including the multiple antennas and the base-band processing unit and the resource, and communicating data using the same, wherein the second device operates the resource using the communicated data.

According to an embodiment of the present disclosure, a method for collecting data for operating a resource by a second device in a WLAN system supportive of multiple antennas includes determining whether there is a need of communicating data with a neighbor network, determining a resource to be used and a method for operating an antenna, a base-band processing unit including the antenna, or a modem including multiple antennas and the base-band processing unit for transmitting data to the neighbor network using multiple antennas unused for data transmission, a base-band processing unit including multiple antennas, or a modem including multiple antennas and a base-band processing unit during the determined time interval, communicating, by a STA, frames with another STA (or an AP) of the neighbor network via an access network query protocol (ANQP) using the antennas and the resource, and communicating data using the same, wherein the second device operates the resource using the communicated data.

According to an embodiment of the present disclosure, a method for collecting data for operating a resource by a first device in a WLAN system supportive of multiple antennas includes receiving data and a data request signal from a second device that belongs to another neighbor network, transmitting data to the second device in response to the data request, and operating the resource using the communicated data by the first device.

According to an embodiment of the present disclosure, a second device in a WLAN system supportive of multiple antennas includes a controller performing an operation of determining the number of antennas and base-band processing units and the number of modems that are available at a particular time, a transmitter performing an operation of transmitting data to a neighbor network using the available antennas, and a receiver performing an operation of receiving data transmitted from the neighbor network using the available antennas.

According to an embodiment of the present disclosure, a second device in a WLAN system supportive of multiple antennas includes a controller performing an operation of determining and changing the number of antennas and the number of base-band processing units to be used for data transmission, the number of antennas and the number of base-band processing units to be used for data communication with a neighbor network, and a transmitter performing an operation of informing the determined number of antennas and the determined number of base-band processing units to an AP of a home basic service set (BSS) and an operation of transmitting data to the neighbor network using the determined antennas, and a receiver performing an operation of receiving data transmitted from the neighbor network using the available antennas.

According to an embodiment of the present disclosure, a second device in a WLAN supportive of multiple antennas includes a controller performing an operation of allocating a resource by which different antennas and base-band processing units are to collect data using a time resource available at a particular time, a transmitter performing an operation of transmitting data to a neighbor network using an antenna, a base-band processing unit including the antenna, or modems including multiple antennas and a base-band processing unit in a time resource available at the particular time, and a receiver performing an operation of receiving data transmitted from the neighbor network using the antenna, the base-band processing unit including multiple antennas, or modem including the multiple antennas and base-band processing unit in the time resource available at the particular time.

In describing embodiments of the present disclosure, the WLAN system is assumed to be a WLAN system supportive of multiple antennas. In describing embodiments of the present disclosure, the WLAN system is assumed to be a WLAN system supportive of multiple channels.

According to an embodiment of the present disclosure, the WLAN system supportive of a multi-user transmission scheme and multiple channels is assumed to have the same structure as the WLAN system described in connection with FIG. 1. In other words, according to an embodiment of the present disclosure, the WLAN system supportive of multiple antennas is assumed to include, for example, multiple APs and multiple STAs.

Figure 2:
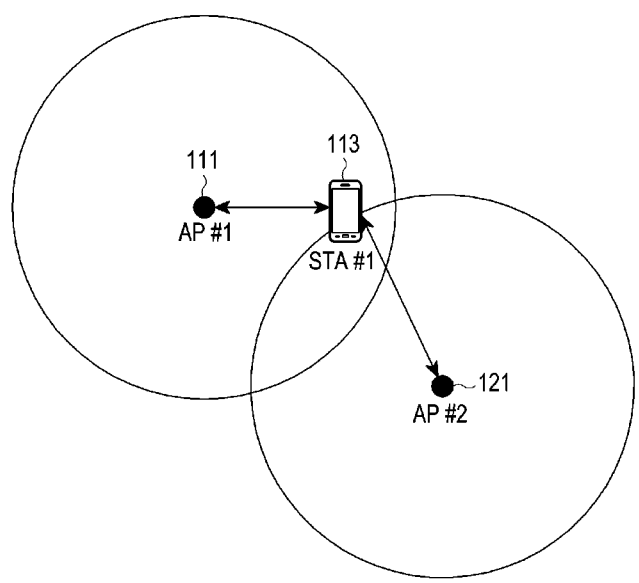
FIG. 2 is a view schematically illustrating an example of a method for managing a base band processing unit and antennas for data communication with a neighbor access point (AP) performed in a general WLAN system supportive of multiple antennas according to an embodiment of the present disclosure.

Now described with reference to FIG. 2 is an example of a method for managing antennas for data communication with a neighbor AP performed in a WLAN system supportive of multiple antennas according to an embodiment of the present disclosure.

FIG. 2 is a view schematically illustrating an example of a method for managing a base band processing unit and antennas for data communication with a neighbor AP performed in a WLAN system supportive of multiple antennas according to an embodiment of the present disclosure.

Prior to the description of FIG. 2, it is assumed that the STA of FIG. 2 has multiple antennas and multiple units that may perform base-band processing and radio frequency (RF) processing.

Referring to FIG. 2, an STA#1 113 is connected with an AP#1 111 and belongs to the BSS of the AP#1 111 and is within a distance from which it may observe a neighbor an AP#2 121.

The STA#1 113 may perform communication with the AP#1 111 using some antennas and some base-band processing units and RF processing units when communicating data with the AP#2 121 belonging to another BSS using the remaining antennas, base-band processing units and RF processing units.

Figure 20:
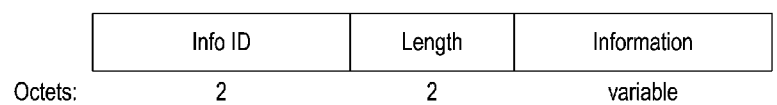

In this case, the data transmittable or receivable by the STA#1 113 and the neighbor AP#2 121 may be included in an information element of a probe request/response frame or ANQP frame as shown in FIG. 20. The data may include data items from which the degree of interference influencing them may be estimated, including some of, for example, a received signal strength index (RSSI), a signal to noise ratio (SINR), and a beamforming beam index as shown in FIGS. 21B and 21C. The data may further include data items that may assist in the AP operating resources, including some of, for example, resource reservation data (transmit opportunity (TXOP) reservation info.) of each network, a next beacon transmission time (target beacon transmission time (TBTT)), and time of stopping communication for scanning a next channel (next scanning gap info.) as shown in FIG. 21A. The data may further include data items useful to select variables for changing channels and setting up an environment, including some of, e.g., data for grasping the capability of each AP (capability information), load (or queue length) of each AP, number of stations active in the network, and service data supportable by each BSS. The data may further include data items useful to select variables for syncing between the BSSs, including some of, for example, frequency offset information and time offset (timing synchronization function (TSF) timing offset) of each BSS.

Such probe request frames and probe response frames may be transmitted periodically at particular time intervals or immediately when particular conditions are met, or may be stopped from being transmitted even at the periods unless the particular conditions are met. The probe request frames and probe response frames may be transmitted a minimum time unit after previous transmission has been done even when the particular conditions are met or may be transmitted only from an STA designated by the AP. The AP may transmit, to the STAs, signals containing an indicator or information that disables the probe request frame from being transmitted even when such conditions occur where the probe request frame should be transmitted, so as to control the transmission of probe request frames from the STAs.

The neighbor AP might not transmit a probe response frame even when receiving probe request frames from the STAs. Specifically, the neighbor AP may receive the probe request frames at time intervals. The neighbor AP may carry the information requested by the probe request frames received during the time intervals on one probe response frame and may transmit the same to the plurality of STAs having sent the probe request frames after the time intervals. Further, the neighbor AP may send response frames responsive to the probe requests immediately after the reception time intervals are terminated or after a particular time elapses in association with the time intervals of receiving the probe request frames or may send the response frames at other time intervals regardless of the time intervals of receiving the probe request frames. The length of the time intervals of receiving the probe request frames, time intervals in transmission of response frames responsive to the probe requests, and a difference between one time interval and a next time interval may be directly determined using the circumstance of the channel or network estimated or measured by the neighbor AP or may be determined using information exchanged wiredly or wirelessly with other neighbor APs or via signals from the STAs. The time intervals may be set to be different for each AP.

An example of a method for managing antennas for data communication with a neighbor AP performed in the WLAN system supportive of multiple antennas according to an embodiment of the present disclosure has been described above in connection with FIG. 2. An example of a method for managing time resources for data communication with a neighbor AP performed in the WLAN system supportive of multiple antennas according to an embodiment of the present disclosure is described below with reference to FIG. 3.

Figure 3:
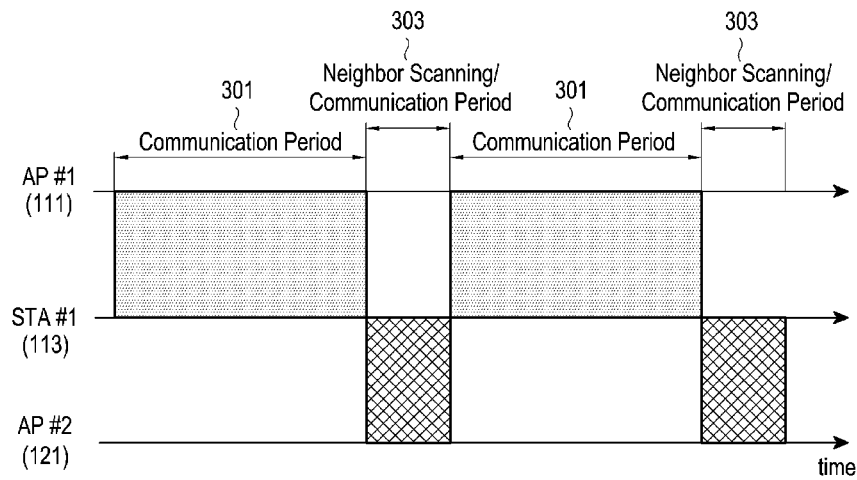
FIG. 3 is a view schematically illustrating an example of a method for managing time resources of a basic service set (BSS) for data communication with a neighbor AP performed in a WLAN system supportive of multiple antennas according to an embodiment of the present disclosure.

FIG. 3 is a view schematically illustrating an example of a method for managing time resources of a BSS for data communication with a neighbor AP performed in a WLAN system supportive of multiple antennas according to an embodiment of the present disclosure.

Referring to FIG. 3, an STA#1 113 is an STA that is connected with an AP#1 111 and is present within a same BSS. For normal wireless communications, the AP#1 111 and the STA#1 113 communicate data within a communication interval 301. The AP#1 111 and the STA#1 113, which are communicating data, stops the data communication when a predetermined time arrives and enters a neighbor AP scanning and data communication interval 303. In the neighbor AP scanning and data communication interval 303, all of the APs and STAs belonging to the BSS of the AP#1 111 terminate data communication and collect data from neighbor APs or communicate data with the neighbor APs. The STA#1 113 communicate data with neighbor APs, for example, the AP#2 121, using all or some antennas and RF and base-band processing units that may be available.

The AP#2 121 and the STA#1 113 do not establish an association therebetween.

The neighbor AP scanning and data communication interval 303 may be assigned periodically or when requested by a particular STA or AP, and data regarding the neighbor AP scanning and data communication as assigned may be carried on a control/management frame such as a particular frame or beacon and may be notified.

An example of a method for managing time resources for data communication with a neighbor AP performed in the WLAN system supportive of multiple antennas according to an embodiment of the present disclosure has been described above in connection with FIG. 3. An example of a data communication procedure between an STA and a neighbor AP performed in the WLAN system supportive of multiple antennas according to an embodiment of the present disclosure is described below with reference to FIG. 4.

Figure 4:
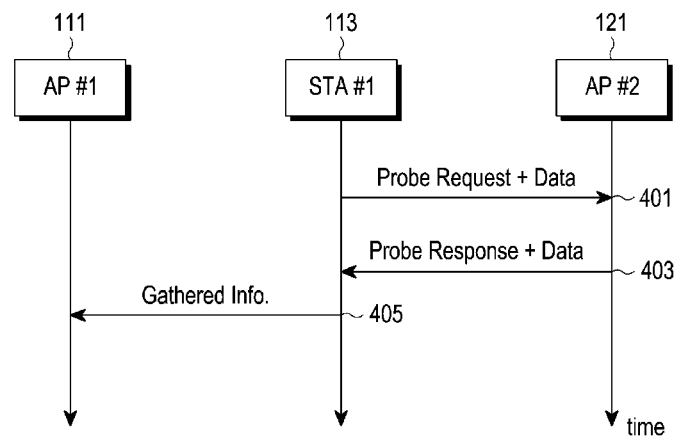
FIG. 4 is a flowchart schematically illustrating an example of a data communication procedure between a station (STA) and a neighbor AP as performed in a WLAN system supportive of multiple antennas according to an embodiment of the present disclosure.

FIG. 4 is a view schematically illustrating an example of a data communication procedure between an STA and a neighbor AP as performed in a WLAN system supportive of multiple antennas according to an embodiment of the present disclosure.

Referring to FIG. 4, an STA#1 113 is an STA that is connected with an AP#1 111 and is present within a same BSS. The STA#1 113, when required to communicate data with the neighbor AP as a particular condition is met, may use an idle antenna and base-band processing unit or change the number of antennas and base-band processing units that are in use and prepare for antennas and base-band processing units for data communication with the neighbor AP to start data communication with the neighbor APs, for example, the AP#2 121, using the neighbor AP scanning and data communication interval.

The particular condition may be designated by various methods. For example, the particular condition may be requested by the AP#2 121 sending some frame to the STA#1 113 or may be determined by a channel or network circumstance measured or estimated by the STA#1 113. In a specific example, there may be included some of the conditions of, for example, when the SINR measured or estimated by the STA#1 113 is less than a particular threshold; when a ratio of channel occupancy by a corresponding network measured or estimated by the STA#1 113 is less than a particular threshold; a noise strength, a ratio of channel occupancy by another network, the number of STAs in network, a network load, or the probability of transmission failure/collision of the STAs measured or estimated by the STA#1 113 is more than a particular threshold; when the number of collisions or average number of collisions per hour in the occupied resource estimated or measured by the STA#1 113 is more than a particular threshold; and when the mobility of the STA#1 113 is more than a particular threshold. If STA#1 113 is a station including multiple antennas and multiple base-band and RF processing chains, the case where there are remaining antennas and base-band and RF processing chains even though the data transmission in communication with the AP#1 111, which is a home AP, meets requirements for data traffic may also be included in the conditions for starting communication to collect information from the neighbor AP using such surplus antennas and base-band and RF processing chains.

First, the STA#1 113 carries data on a probe request frame to the AP#2 121 at operation 401. The AP#2 121 receives the probe request frame and data included in the probe request frame from the STA#1 113 and grasps the characteristics of the received data and received signal and the characteristics of the received channel. The AP#2 121 carries data on a probe response frame to the STA#1 113 at operation 403. The AP#2 121 may collect the data of the BSS where the STA#1 113 belongs and the data of the STA#1 113 and the STA#1 113 may collect the data of the BSS where the AP#2 121 belongs and the data of the AP#2 121 via such data communication. The STA#1 113 may share the collected data by sending the data to the AP#1 111 within its BSS at operation 405.

The data communicable by the STA#1 113 and the neighbor AP#2 121 may include data items enabling the estimation of the degree of interference influencing them, for example, some of an RSSI, an SINR, and a beamforming index as shown in FIG. 21. The data may further include data items that may assist in the AP operating resources, including some of, for example, resource reservation data (TXOP reservation info.) of each network, a TBTT), and time of stopping communication for scanning a next channel (Next scanning gap info.) as shown in FIG. 21. The data may further include data items useful to select variables for changing channels and setting up an environment, including some of, for example, data for grasping the capability of each AP (capability information), load (or queue length) of each AP, number of stations active in the network, and service data supportable by each BSS. The data may further include data items useful to select variables for syncing between the BSSs, including some of, for example, frequency offset information and time offset (TSF timing offset) of each BSS.

Even when such particular condition is met where data communication is required with the neighbor AP, the transmission may be performed only a particular minimum time unit after the previous transmission is done, or the transmission may be performed only by an STA designated by the AP. The AP may transmit, to the STAs, signals containing an indicator or information that disables the probe request frame from being transmitted even when the STA is encountered with the particular condition, so as to control the transmission of probe request frames from the STAs.

The neighbor AP might not transmit a probe response frame even when receiving probe request frames from the STAs. Specifically, the neighbor AP may receive the probe request frames at time intervals. The neighbor AP may carry the information requested by the probe request frames received during the time intervals on one probe response frame and may transmit the same to the plurality of STAs having sent the probe request frames after the time intervals. Further, the neighbor AP may send response frames responsive to the probe requests immediately after the reception time intervals are terminated or after a particular time elapses in association with the time intervals of receiving the probe request frames or may send the response frames at other time intervals regardless of the time intervals of receiving the probe request frames. The length of the time intervals of receiving the probe request frames, time intervals in transmission of response frames responsive to the probe requests, and a difference between one time interval and a next time interval may be directly determined using the circumstance of the channel or network estimated or measured by the neighbor AP or may be determined using information exchanged wiredly or wirelessly with other neighbor APs or via signals from the STAs. The time intervals may be set to be different for each AP.

Meanwhile, the probe request frame and the probe response frame may be any signals, for example, ANQPs, which may be communicated between the STA and the AP even without any association.

An example of a data communication procedure performed between an STA and a neighbor AP performed in the WLAN system supportive of multiple antennas according to an embodiment of the present disclosure has been described above in connection with FIG. 4. Another example of a data communication procedure between an STA and a neighbor AP performed in the WLAN system supportive of multiple antennas according to an embodiment of the present disclosure is described below with reference to FIG. 5.

Figure 5:
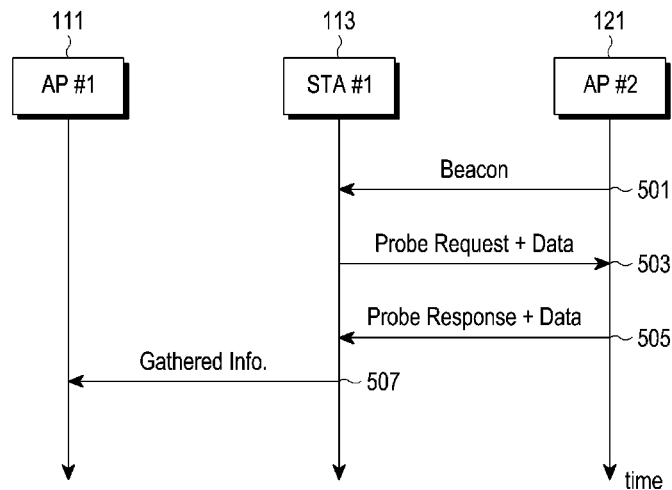
FIG. 5 is a view schematically illustrating an example of a data communication procedure between an STA and a neighbor AP as performed in a WLAN system supportive of multiple antennas according to an embodiment of the present disclosure.

FIG. 5 is a view schematically illustrating an example of a data communication procedure between an STA and a neighbor AP as performed in a WLAN system supportive of multiple antennas according to an embodiment of the present disclosure.

Referring to FIG. 5, an STA#1 113 is an STA that is connected with an AP#1 111 and is present within a same BSS. The STA#1 113, when required to communicate data with the neighbor AP as a particular condition is met, may use an idle antenna and base-band processing unit or change the number of antennas and base-band processing units that are in use and prepare for antennas and base-band processing units for data communication with the neighbor AP to start data communication with the neighbor APs, for example, the AP#2 121, using the neighbor AP scanning and data communication interval.

The particular condition may be designated by various methods. For example, the particular condition may be requested by the AP#2 121 sending some frame to the STA#1 113 or may be determined by a channel or network circumstance measured or estimated by the STA#1 113. In a specific example, there may be included some of the conditions of, for example, when the SNR measured or estimated by the STA#1 113 is less than a particular threshold; when a ratio of channel occupancy by a corresponding network measured or estimated by the STA#1 113 is less than a particular threshold; a noise strength, a ratio of channel occupancy by another network, the number of STAs in network, a network load, or the probability of transmission failure/collision of the STAs estimated or measured by the STA#1 113 is more than a particular threshold; when the number of collisions or average number of collisions per hour in the occupied resource estimated or measured by the STA#1 113 is more than a particular threshold; and when the mobility of the STA#1 113 is more than a particular threshold. If the STA#1 113 is a station including multiple antennas and multiple base-band and RF processing chains, the case where there are remaining antennas and base-band and RF processing chains even though the data transmission in communication with AP#1 111, which is a home AP, meets requirements for data traffic may also be included in the conditions for starting communication to collect information from the neighbor AP using such surplus antennas and base-band and RF processing chains.

First, the STA#1 113 receives a beacon signal from the AP#2 121 to grasp the channel circumstance and basic data regarding AP#2 121 at operation 501. The beacon signal need not inevitably be a beacon signal and may rather be one of, for example, a request to send (RTS) frame, a clear to send (CTS) frame, a probe request frame and probe response frame, and a traffic indication map frame that is sent from the AP#2 121 and received by the STA#1 113 to allow it to be known that the sender is the AP#2 121. The STA#1 113 may process data using the channel circumstance grasped from the received signal and carries the data on a probe request frame to the AP#2 121 at operation 503. The signal received by the STA#1 113 may be used to determine the particular condition to start data communication between the STA#1 113 and the AP#2 121. The AP#2 121 receives the probe request frame and data included in the probe request frame from the STA#1 113 and grasps the characteristics of the received data and received signal and the characteristics of the received channel. The AP#2 121 carries data on a probe response frame to the STA#1 113 at operation 505. The AP#2 121 may collect the data of the BSS where the STA#1 113 belongs and the data of the STA#1 113 and the STA#1 113 may collect the data of the BSS where the AP#2 121 belongs and the data of AP#2 121 via such data communication. The STA#1 113 may share the collected data by sending the data to the AP#1 111 within its BSS at operation 507.

The data communicable by the STA#1 113 and neighbor AP#2 121 may include data items enabling the estimation of the degree of interference influencing them, for example, some of an RSSI, an SINR, and a beamforming index. The data may further include data items that may assist in the AP operating resources, including some of, e.g., resource reservation data (TXOP reservation info.) of each network, a TBTT), and time of stopping communication for scanning a next channel (Next scanning gap info.). The data may further include data items useful to select variables for changing channels and setting up an environment, including some of, for example, data for grasping the capability of each AP (capability information), load (or queue length) of each AP, number of stations active in the network, and service data supportable by each BSS. The data may further include data items useful to select variables for syncing between the BSSs, including some of, for example, frequency offset information and time offset (TSF timing offset) of each BSS.

Even when such particular condition is met where the STA#1 113 and the AP#2 121 start data communication, the transmission may be performed only a particular minimum time unit after the previous transmission is done, or the transmission may be performed only by an STA designated by the AP. The AP may transmit, to the STAs, signals containing an indicator or information that disables the probe request frame from being transmitted even when the STA is encountered with the particular condition, so as to control the transmission of probe request frames from the STAs.

The neighbor AP might not transmit a probe response frame even when receiving probe request frames from the STAs. Specifically, the neighbor AP may receive the probe request frames at time intervals. The neighbor AP may carry the information requested by the probe request frames received during the time intervals on one probe response frame and may transmit the same to the plurality of STAs having sent the probe request frames after the time intervals. Further, the neighbor AP may send response frames responsive to the probe requests immediately after the reception time intervals are terminated or after a particular time elapses in association with the time intervals of receiving the probe request frames or may send the response frames at other time intervals regardless of the time intervals of receiving the probe request frames. The length of the time intervals of receiving the probe request frames, time intervals in transmission of response frames responsive to the probe requests, and a difference between one time interval and a next time interval may be directly determined using the circumstance of the channel or network estimated or measured by the neighbor AP or may be determined using information exchanged wiredly or wirelessly with other neighbor APs or via signals from the STAs. The time intervals may be set to be different for each AP.

The probe request frame and the probe response frame may be any signals, for example, ANQPs, which may be communicated between the STA and the AP even without any association.

An example of a data communication procedure performed between an STA and a neighbor AP performed in the WLAN system supportive of multiple antennas according to an embodiment of the present disclosure has been described above in connection with FIG. 5. Another example of a data communication procedure between an STA and a neighbor AP performed in the WLAN system supportive of multiple antennas according to an embodiment of the present disclosure is described below with reference to FIG. 6.

Figure 6:
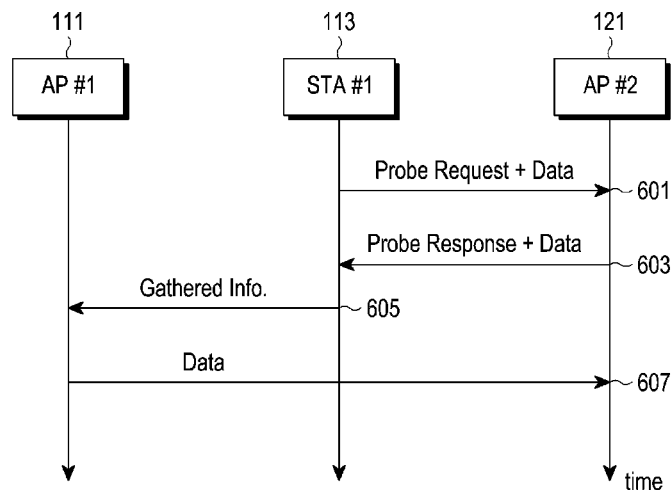
FIG. 6 is a view schematically illustrating an example of a data communication procedure between an STA and a neighbor AP as performed in a WLAN system supportive of multiple antennas according to an embodiment of the present disclosure.

FIG. 6 is a view schematically illustrating an example of a data communication procedure between an STA and a neighbor AP as performed in a WLAN system supportive of multiple antennas according to an embodiment of the present disclosure.

Referring to FIG. 6, an STA#1 113 is an STA that is connected with an AP#1 111 and is present within a same BSS. The STA#1 113, when required to communicate data with the neighbor AP as a particular condition is met, may use an idle antenna and base-band processing unit or change the number of antennas and base-band processing units that are in use and prepare for antennas and base-band processing units for data communication with the neighbor AP to start data communication with the neighbor APs, for example, the AP#2 121, using the neighbor AP scanning and data communication interval.

The particular condition may be designated by various methods. For example, the particular condition may be requested by the AP#2 121 sending some frame to the STA#1 113 or may be determined by a channel or network circumstance measured or estimated by the STA#1 113. In a specific example, there may be included some of the conditions of, for example, when the SNR measured or estimated by the STA#1 113 is less than a particular threshold; when a ratio of channel occupancy by a corresponding network measured or estimated by the STA#1 113 is less than a particular threshold; a noise strength, a ratio of channel occupancy by another network, the number of STAs in network, a network load, or the probability of transmission failure/collision of the STAs estimated or measured by the STA#1 113 is more than a particular threshold; when the number of collisions or average number of collisions per hour in the occupied resource estimated or measured by the STA#1 113 is more than a particular threshold; and when the mobility of the STA#1 113 is more than a particular threshold. If the STA#1 113 is a station including multiple antennas and multiple base-band and RF processing chains, the case where there are remaining antennas and base-band and RF processing chains even though the data transmission in communication with the AP#1 111, which is a home AP, meets requirements for data traffic may also be included in the conditions for starting communication to collect information from the neighbor AP using such surplus antennas and base-band and RF processing chains.

First, the STA#1 113 carries data on a probe request frame to the AP#2 121 at operation 601. The AP#2 121 receives the probe request frame and data included in the probe request frame from the STA#1 113 and grasps the characteristics of the received data and received signal and the characteristics of the received channel. The AP#2 121 carries data on a probe response frame to the STA#1 113 at operation 603. The AP#2 121 may collect the data of the BSS where the STA#1 113 belongs and the data of the STA#1 113 and the STA#1 113 may collect the data of the BSS where the AP#2 121 belongs and the data of the AP#2 121 via such data communication. The STA#1 113 shares the collected data by sending the data to the AP#1 111 within its BSS at operation 605. The AP#1 111 puts together data related to the AP#2 121 among the collected within its BSS and wiredly or wirelessly transfers the same to the AP#2 121 at operation 607.

The data communicable by the STA#1 113 and the neighbor AP#2 121 may include data items enabling the estimation of the degree of interference influencing them, for example, some of an RSSI, an SINR, and a beamforming index. The data may further include data items that may assist in the AP operating resources, including some of, for example, resource reservation data (TXOP reservation info.) of each network, a TBTT), and time of stopping communication for scanning a next channel (Next scanning gap info.). The data may further include data items useful to select variables for changing channels and setting up an environment, including some of, for example, data for grasping the capability of each AP (capability information), load (or queue length) of each AP, number of stations active in the network, and service data supportable by each BSS. The data may further include data items useful to select variables for syncing between the BSSs, including some of, for example, frequency offset information and time offset (TSF timing offset) of each BSS.

Even when such particular condition is met where the STA#1 113 and the AP#2 121 start data communication, the transmission may be performed only a particular minimum time unit after the previous transmission is done, or the transmission may be performed only by an STA designated by the AP. The AP may transmit, to the STAs, signals containing an indicator or information that disables the probe request frame from being transmitted even when the STA is encountered with the particular condition, so as to control the transmission of probe request frames from the STAs.

The neighbor AP might not transmit a probe response frame even when receiving probe request frames from the STAs. Specifically, the neighbor AP may receive the probe request frames at time intervals. The neighbor AP may carry the information requested by the probe request frames received during the time intervals on one probe response frame and may transmit the same to the plurality of STAs having sent the probe request frames after the time intervals. Further, the neighbor AP may send response frames responsive to the probe requests immediately after the reception time intervals are terminated or after a particular time elapses in association with the time intervals of receiving the probe request frames or may send the response frames at other time intervals regardless of the time intervals of receiving the probe request frames. The length of the time intervals of receiving the probe request frames, time intervals in transmission of response frames responsive to the probe requests, and a difference between one time interval and a next time interval may be directly determined using the circumstance of the channel or network estimated or measured by the neighbor AP or may be determined using information exchanged wiredly or wirelessly with other neighbor APs or via signals from the STAs. The time intervals may be set to be different for each AP.

The probe request frame and the probe response frame may be any signals, for example, ANQPs, which may be communicated between the STA and the AP even without any association.

An example of a data communication procedure performed between an STA and a neighbor AP performed in the WLAN system supportive of multiple antennas according to an embodiment of the present disclosure has been described above in connection with FIG. 6. Another example of a data communication procedure between an STA and a neighbor AP performed in the WLAN system supportive of multiple antennas according to an embodiment of the present disclosure is described below with reference to FIG. 7.

Figure 7:
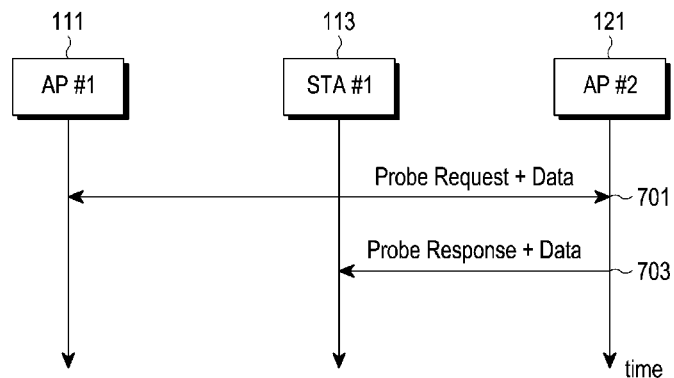
FIG. 7 is a view schematically illustrating an example of a data communication procedure between an STA and a neighbor AP as performed in a WLAN system supportive of multiple antennas according to an embodiment of the present disclosure.

FIG. 7 is a view schematically illustrating an example of a data communication procedure between an STA and a neighbor AP as performed in a WLAN system supportive of multiple antennas according to an embodiment of the present disclosure.

Referring to FIG. 7, an STA#1 113 is an STA that is connected with an AP#1 111 and is present within a same BSS. The STA#1 113, when required to communicate data with the neighbor AP as a particular condition is met, may use an idle antenna and base-band processing unit or change the number of antennas and base-band processing units that are in use and prepare for antennas and base-band processing units for data communication with the neighbor AP to start data communication with the neighbor APs, for example, the AP#2 121, using the neighbor AP scanning and data communication interval.

The particular condition may be designated by various methods. For example, the particular condition may be requested by the AP#2 121 sending some frame to the STA#1 113 or may be determined by a channel or network circumstance measured or estimated by the STA#1 113. In a specific example, there may be included some of the conditions of, for example, when the SNR measured or estimated by the STA#1 113 is less than a particular threshold; when a ratio of channel occupancy by a corresponding network measured or estimated by the STA#1 113 is less than a particular threshold; a noise strength, a ratio of channel occupancy by another network, the number of STAs in network, a network load, or the probability of transmission failure/collision of the STAs measured or estimated by the STA#1 113 is more than a particular threshold; when the number of collisions or average number of collisions per hour in the occupied resource estimated or measured by the STA#1 113 is more than a particular threshold; and when the mobility of the STA#1 113 is more than a particular threshold. If the STA#1 113 is a station including multiple antennas and multiple base-band and RF processing chains, the case where there are remaining antennas and base-band and RF processing chains even though the data transmission in communication with the AP#1 111, which is a home AP, meets requirements for data traffic may also be included in the conditions for starting communication to collect information from the neighbor AP using such surplus antennas and base-band and RF processing chains.

First, the STA#1 113 carries data on a probe request frame to the AP#2 121 at operation 701. The AP#2 121 receives the probe request frame and data included in the probe request frame from the STA#1 113 and grasps the characteristics of the received data and received signal and the characteristics of the received channel. The AP#1 111 or other neighbor STAs may also receive probe request frames transmitted from the STA#1 113 to thereby receive data that the STA#1 113 intends to send to the AP#2 121. The AP#2 121 carries data on a probe response frame to the STA#1 113 at operation 703. The AP#2 121 may collect the data of the BSS where the STA#1 113 belongs and the data of the STA#1 113 and the STA#1 113 may collect the data of the BSS where the AP#2 121 belongs and the data of AP#2 121 via such data communication. Further, the AP#1 111 may be aware of, for example, influence on the STA#1 113 from the AP#2 121 or channel circumstance between the AP#2 121 and the STA#1 113.

The data communicable by the STA#1 113 and the neighbor AP#2 121 may include data items enabling the estimation of the degree of interference influencing them, for example, some of an RSSI, an SINR, and a beamforming index. The data may further include data items that may assist in the AP operating resources, including some of, for example, resource reservation data (TXOP reservation info.) of each network, a next beacon transmission time (TBTT), and time of stopping communication for scanning a next channel (Next scanning gap info.). The data may further include data items useful to select variables for changing channels and setting up an environment, including some of, for example, data for grasping the capability of each AP (capability information), load (or queue length) of each AP, number of stations active in the network, and service data supportable by each BSS. The data may further include data items useful to select variables for syncing between the BSSs, including some of, for example, frequency offset information and time offset (TSF timing offset) of each BSS.

Even when such particular condition is met where the STA#1 113 and the AP#2 121 start data communication, the transmission may be performed only a particular minimum time unit after the previous transmission is done, or the transmission may be performed only by an STA designated by the AP. The AP may transmit, to the STAs, signals containing an indicator or information that disables the probe request frame from being transmitted even when the STA is encountered with the particular condition, so as to control the transmission of probe request frames from the STAs.

The neighbor AP might not transmit a probe response frame even when receiving probe request frames from the STAs. Specifically, the neighbor AP may receive the probe request frames at time intervals. The neighbor AP may carry the information requested by the probe request frames received during the time intervals on one probe response frame and may transmit the same to the plurality of STAs having sent the probe request frames after the time intervals. Further, the neighbor AP may send response frames responsive to the probe requests immediately after the reception time intervals are terminated or after a particular time elapses in association with the time intervals of receiving the probe request frames or may send the response frames at other time intervals regardless of the time intervals of receiving the probe request frames. The length of the time intervals of receiving the probe request frames, time intervals in transmission of response frames responsive to the probe requests, and a difference between one time interval and a next time interval may be directly determined using the circumstance of the channel or network estimated or measured by the neighbor AP or may be determined using information exchanged wiredly or wirelessly with other neighbor APs or via signals from the STAs. The time intervals may be set to be different for each AP.

The probe request frame and the probe response frame may be any signals, for example, ANQPs, which may be communicated between the STA and the AP even without any association.

An example of a data communication procedure performed between an STA and a neighbor AP performed in the WLAN system supportive of multiple antennas according to an embodiment of the present disclosure has been described above in connection with FIG. 7. Another example of a data communication procedure between an STA and a neighbor AP performed in the WLAN system supportive of multiple antennas according to an embodiment of the present disclosure is described below with reference to FIG. 8.

Figure 8:
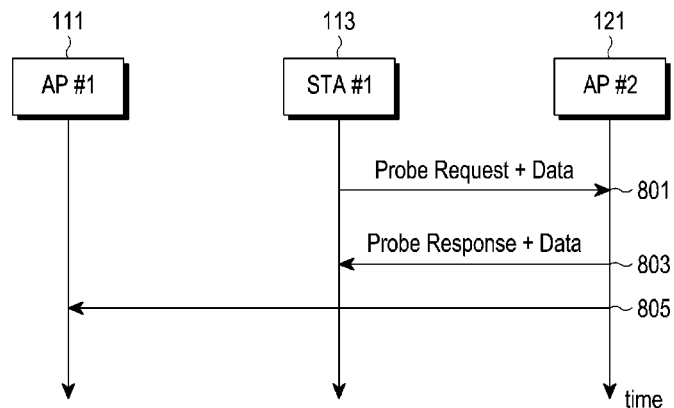
FIG. 8 is a view schematically illustrating an example of a data communication procedure between an STA and a neighbor AP as performed in a WLAN system supportive of multiple antennas according to an embodiment of the present disclosure.

FIG. 8 is a view schematically illustrating an example of a data communication procedure between an STA and a neighbor AP as performed in a WLAN system supportive of multiple antennas according to an embodiment of the present disclosure.

Referring to FIG. 8, an STA#1 113 is an STA that is connected with an AP#1 111 and is present within a same BSS. The STA#1 113, when required to communicate data with the neighbor AP as a particular condition is met, may use an idle antenna and base-band processing unit or change the number of antennas and base-band processing units that are in use and prepare for antennas and base-band processing units for data communication with the neighbor AP to start data communication with the neighbor APs, for example, the AP#2 121, using the neighbor AP scanning and data communication interval.

The particular condition may be designated by various methods. For example, the particular condition may be requested by the AP#2 121 sending some frame to the STA#1 113 or may be determined by a channel or network circumstance measured or estimated by the STA#1 113. In a specific example, there may be included some of the conditions of, for example, when the SNR measured or estimated by the STA#1 113 is less than a particular threshold; when a ratio of channel occupancy by a corresponding network measured or estimated by the STA#1 113 is less than a particular threshold; a noise strength, a ratio of channel occupancy by another network, the number of STAs in network, a network load, or the probability of transmission failure/collision of the STAs estimated or measured by the STA#1 113 is more than a particular threshold; when the number of collisions or average number of collisions per hour in the occupied resource estimated or measured by the STA#1 113 is more than a particular threshold; and when the mobility of the STA#1 113 is more than a particular threshold. If the STA#1 113 is a station including multiple antennas and multiple base-band and RF processing chains, the case where there are remaining antennas and base-band and RF processing chains even though the data transmission in communication with the AP#1 111, which is a home AP, meets requirements for data traffic may also be included in the conditions for starting communication to collect information from the neighbor AP using such surplus antennas and base-band and RF processing chains.

First, the STA#1 113 carries data on a probe request frame to the AP#2 121 at operation 801. The AP#2 121 receives the probe request frame and data included in the probe request frame from the STA#1 113 and grasps the characteristics of the received data and received signal and the characteristics of the received channel. The AP#2 121 carries data on a probe response frame to the STA#1 113 at operation 803. The AP#1 111 or other neighbor STAs may also receive probe response frames transmitted from the AP#2 121 to thereby receive data that AP#2 121 intends to send to the STA#1 113 at operation 805. The AP#2 121 may collect the data of the BSS where the STA#1 113 belongs and the data of the STA#1 113 and the STA#1 113 may collect the data of the BSS where the AP#2 121 belongs and the data of AP#2 121 via such data communication. Further, the AP#1 111 may be aware of, for example, influence on the AP#2 121 from the BSS of the STA#1 113 and the other AP#1 111 or channel circumstance between the AP#2 121 and the STA#1 113.

The data communicable by the STA#1 113 and the neighbor AP#2 121 may include data items enabling the estimation of the degree of interference influencing them, for example, some of an RSSI, an SINR, and a beamforming index. The data may further include data items that may assist in the AP operating resources, including some of, for example, resource reservation data (TXOP reservation info.) of each network, a TBTT), and time of stopping communication for scanning a next channel (Next scanning gap info.). The data may further include data items useful to select variables for changing channels and setting up an environment, including some of, for example, data for grasping the capability of each AP (capability information), load (or queue length) of each AP, number of stations active in the network, and service data supportable by each BSS. The data may further include data items useful to select variables for syncing between the BSSs, including some of, for example, frequency offset information and time offset (TSF timing offset) of each BSS.

Even when such particular condition is met where the STA#1 113 and the AP#2 121 start data communication, the transmission may be performed only a particular minimum time unit after the previous transmission is done, or the transmission may be performed only by an STA designated by the AP. The AP may transmit, to the STAs, signals containing an indicator or information that disables the probe request frame from being transmitted even when the STA is encountered with the particular condition, so as to control the transmission of probe request frames from the STAs.

The neighbor AP might not transmit a probe response frame even when receiving probe request frames from the STAs. Specifically, the neighbor AP may receive the probe request frames at time intervals. The neighbor AP may carry the information requested by the probe request frames received during the time intervals on one probe response frame and may transmit the same to the plurality of STAs having sent the probe request frames after the time intervals. Further, the neighbor AP may send response frames responsive to the probe requests immediately after the reception time intervals are terminated or after a particular time elapses in association with the time intervals of receiving the probe request frames or may send the response frames at other time intervals regardless of the time intervals of receiving the probe request frames. The length of the time intervals of receiving the probe request frames, time intervals in transmission of response frames responsive to the probe requests, and a difference between one time interval and a next time interval may be directly determined using the circumstance of the channel or network estimated or measured by the neighbor AP or may be determined using information exchanged wiredly or wirelessly with other neighbor APs or via signals from the STAs. The time intervals may be set to be different for each AP.

The probe request frame and the probe response frame may be any signals, for example, ANQPs, which may be communicated between the STA and the AP even without any association.

An example of a data communication procedure performed between an STA and a neighbor AP performed in the WLAN system supportive of multiple antennas according to an embodiment of the present disclosure has been described above in connection with FIG. 8. Another example of a data communication procedure by the STA and APs performing data communication with the neighbor AP while simultaneously performing data communication in a home BSS using different antennas and base-band processing units in the WLAN system supportive of multiple antennas according to an embodiment of the present disclosure is described below with reference to FIG. 9.

Figure 9:
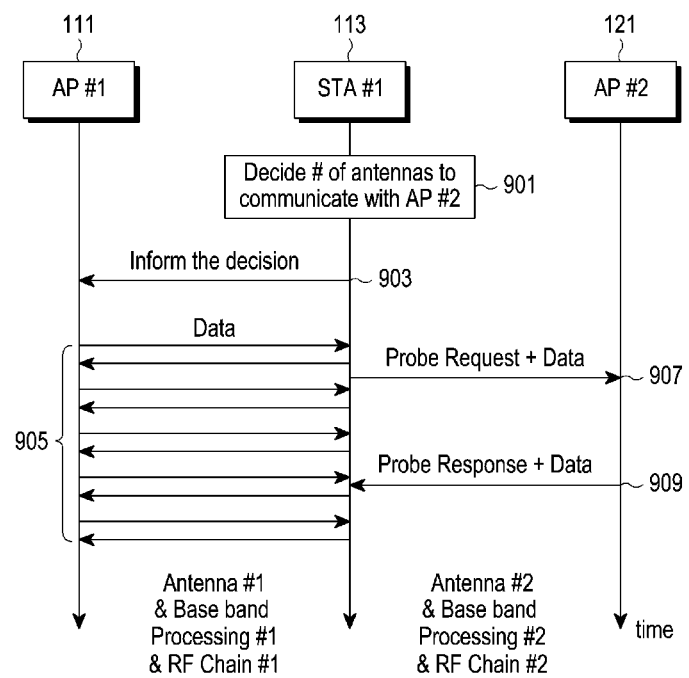
FIG. 9 is a view schematically illustrating an example of a data communication procedure between an STA and a neighbor AP as performed in a WLAN system supportive of multiple antennas according to an embodiment of the present disclosure.

FIG. 9 is a view schematically illustrating an example of a data communication procedure between an STA and a neighbor AP as performed in a WLAN system supportive of multiple antennas according to an embodiment of the present disclosure.

Referring to FIG. 9, an STA#1 113 is an STA that is connected with an AP#1 111 and is present within a same BSS. The STA#1 113, when required to communicate data with the neighbor AP as a particular condition is met, may use an idle antenna and base-band processing unit and a modem or change the number of antennas and base-band processing units and modems that are in use and prepare for antennas and base-band processing units and modems for data communication with the neighbor AP at operation 901. If there is a change in the number of antennas and base-band processing units and modems to be used for data communication with the AP#1 111, the STA#1 113 notifies the AP#1 111 that the number of antennas and base-band processing units and modems to be used for data communication with the AP#1 111 at operation 903. Thereafter, the STA#1 113 continues to perform data communication with AP#1 111 using the antennas and base-band processing units and modems for use in data communication with AP#1 111, which are represented as Antenna #1 & Base band Processing #1 & RF Chain #1 in FIG. 9, as an example at operation 905. the STA#1 113 simultaneously starts duplex scheme with neighbor APs, for example, the AP#2 121, using the antennas and base-band processing units and modems for use in data communication with the AP#1 121, which are represented as Antenna #2 & Base band Processing #2 & RF Chain #2 in FIG. 9, as an example at operations 907 and 909.

The particular condition at operation 901 may be designated by various methods. For example, the particular condition may be requested by the AP#2 121 sending some frame to the STA#1 113 or may be determined by a channel or network circumstance measured or estimated by the STA#1 113. In a specific example, there may be included some of the conditions of, for example, when the SNR measured or estimated by the STA#1 113 is less than a particular threshold; when a ratio of channel occupancy by a corresponding network measured or estimated by the STA#1 113 is less than a particular threshold; a noise strength, a ratio of channel occupancy by another network, the number of STAs in network, a network load, or the probability of transmission failure/collision of the STAs estimated or measured by the STA#1 113 is more than a particular threshold; when the number of collisions or average number of collisions per hour in the occupied resource estimated or measured by the STA#1 113 is more than a particular threshold; and when the mobility of the STA#1 113 is more than a particular threshold. If the STA#1 113 is a station including multiple antennas and multiple base-band and RF processing chains, the case where there are remaining antennas and base-band and RF processing chains even though the data transmission in communication with the AP#1 111, which is a home AP, meets requirements for data traffic may also be included in the conditions for determining the number of antennas and base-band and RF processing chains to collect such neighbor AP information.

First, the STA#1 113 carries data on a probe request frame to the AP#2 121 at operation 907. The AP#2 121 receives the probe request frame and data included in the probe request frame from the STA#1 113 and grasps the characteristics of the received data and received signal and the characteristics of the received channel. The AP#2 121 carries data on a probe response frame to the STA#1 113 at operation 909. The AP#1 111 may also receive probe response frames transmitted from the AP#2 121 to thereby receive data that the AP#2 121 intends to send to the STA#1 113. The AP#2 121 may collect the data of the BSS where the STA#1 113 belongs and the data of the STA#1 113 and the STA#1 113 may collect the data of the BSS where the AP#2 121 belongs and the data of the AP#2 121 via such data communication. Further, the AP#1 111 may be aware of, for example, influence on the AP#2 121 from the BSS of the STA#1 113 and another the AP#1 111 or channel circumstance between the AP#2 121 and the STA#1 113.

The data communicable by the STA#1 113 and the neighbor AP#2 121 may include data items enabling the estimation of the degree of interference influencing them, for example, some of an RSSI, an SINR, and a beamforming index. The data may further include data items that may assist in the AP operating resources, including some of, for example, resource reservation data (TXOP reservation info.) of each network, a TBTT), and time of stopping communication for scanning a next channel (Next scanning gap info.). The data may further include data items useful to select variables for changing channels and setting up an environment, including some of, for example, data for grasping the capability of each AP (capability information), load (or queue length) of each AP, number of stations active in the network, and service data supportable by each BSS. The data may further include data items useful to select variables for syncing between the BSSs, including some of, for example, frequency offset information and time offset (TSF timing offset) of each BSS.

Even upon meeting the particular conditions for varying or determining the number of antennas and base-band and RF processing units and modems to collect information from the neighbor AP, the transmission may be performed only a particular minimum time unit after the previous transmission is done, or the transmission may be performed only by an STA designated by the AP. The AP may transmit, to the STAs, signals containing an indicator or information that disables the probe request frame from being transmitted even when the STA is encountered with the particular condition, so as to control the transmission of probe request frames from the STAs.

The neighbor AP might not transmit a probe response frame even when receiving probe request frames from the STAs. Specifically, the neighbor AP may receive the probe request frames at time intervals. The neighbor AP may carry the information requested by the probe request frames received during the time intervals on one probe response frame and may transmit the same to the plurality of STAs having sent the probe request frames after the time intervals. Further, the neighbor AP may send response frames responsive to the probe requests immediately after the reception time intervals are terminated or after a particular time elapses in association with the time intervals of receiving the probe request frames or may send the response frames at other time intervals regardless of the time intervals of receiving the probe request frames. The length of the time intervals of receiving the probe request frames, time intervals in transmission of response frames responsive to the probe requests, and a difference between one time interval and a next time interval may be directly determined using the circumstance of the channel or network estimated or measured by the neighbor AP or may be determined using information exchanged wiredly or wirelessly with other neighbor APs or via signals from the STAs. The time intervals may be set to be different for each AP.

The probe request frame and the probe response frame may be any signals, for example, ANQPs, which may be communicated between the STA and the AP even without any association.

An example of a procedure for performing data communication with the neighbor AP while simultaneously performing data communication in a home BSS using different antennas and base-band processing units in the WLAN system supportive of multiple antennas according to an embodiment of the present disclosure has been described above in connection with FIG. 9. An example of a procedure for performing data communication with the neighbor AP while simultaneously performing data communication in a home BSS using different antennas, a base-band processing units including multiple antennas, or a modem including multiple antennas and a base-band processing unit in the WLAN system supportive of multiple antennas according to an embodiment of the present disclosure is described below in connection with FIG. 10.

Figure 10:
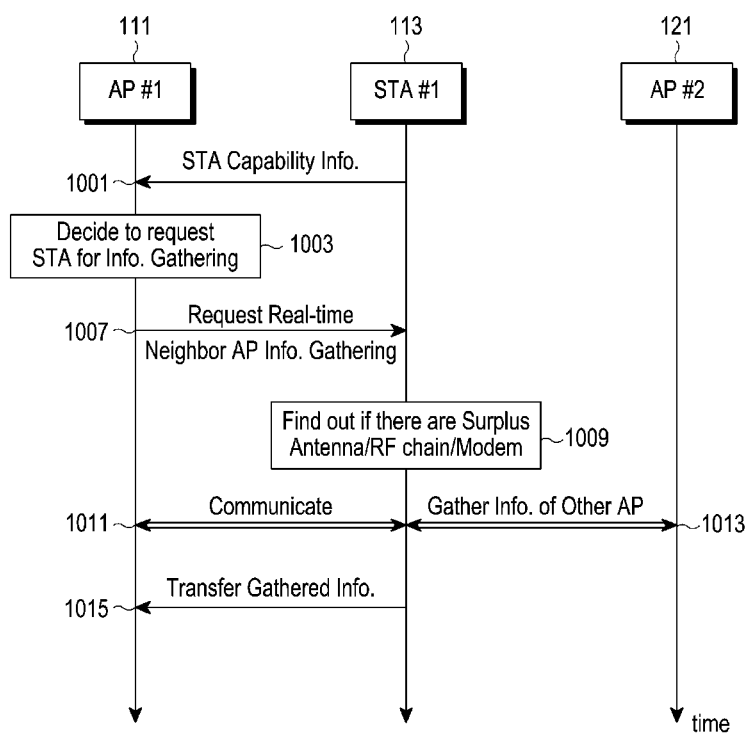
FIG. 10 is a view schematically illustrating an example of a data communication procedure between an STA and a neighbor AP as performed in a WLAN system supportive of multiple antennas according to an embodiment of the present disclosure.

FIG. 10 is a view schematically illustrating an example of a data communication procedure between an STA and a neighbor AP as performed in a WLAN system supportive of multiple antennas according to an embodiment of the present disclosure.

Referring to FIG. 10, an STA#1 113 is an STA that is connected with an AP#1 111 and is present within a same BSS. The STA#1 113 provides the AP#1 111 with information on its possessing multiple antennas or a base-band processing units including multiple antennas or a modem including multiple antennas and a base-band processing unit when accessing the BSS, when the network requests to provide information, or when a particular condition is met at operation 1001. When a particular condition is met considering the station information 1001 collected from the station and other information, and the STA#1 113 has remaining resources among the antennas, the base-band processing unit including antennas or modems including antennas and a base-band processing unit as the STA#1 113 possesses, the AP#1 111 determines to send a request for collecting information on the neighbor AP using the remaining resources at operation 1003. The AP#1 111 sends a request for collecting the information on the neighbor AP to the STA#1 113 at operation 1007. The STA#1 113 then uses unused antennas, base-band processing units including antennas, or modems including antennas and base-band processing units, turns some of the used antennas, base-band processing units including antennas, or modems including antennas and base-band processing units into an idle state, or specific or a specific number of antennas, base-band processing units including antennas, or modems including antennas and base-band processing units as designated by the AP#1 111 to prepare to collect the information on the neighbor AP at operation 1009. Thereafter, the STA#1 113 continues to perform data communication with the AP#1 111 using the antennas, base-band processing units including antennas, or modems including antennas and base-band processing units to be used in data communication with the AP#1 111 as determined in operation 1009 at operation 1011. The STA#1 113 simultaneously collects the information on the neighbor AP, for example, the AP#2 121, using the antennas, base-band processing units including antennas, or modems including antennas and base-band processing units to be used for data communication with AP#2 121 as determined in operation 1009 at operation 1013. The STA#1 113 thereafter transfers the collected information to the AP#1 111 at operation 1015.

The particular condition considered in operation 1003 may be designated by various methods. For example, the particular condition may be requested by the AP#2 121 or the STA#1 113 sending some frame to the AP#1 111 or may be determined by a channel or network circumstance measured or estimated by the AP#1 111. In a specific example, there may be included some of the conditions of, for example, when the SINR measured or estimated by the AP#1 111 is less than a particular threshold; when a ratio of channel occupancy by a corresponding network measured or estimated by the AP#1 111 is less than a particular threshold; a noise strength, a ratio of channel occupancy by another network, the number of STAs in network, a network load, or the probability of transmission failure/collision of the STAs estimated or measured by the AP#1 111 is more than a particular threshold; when the number of collisions or average number of collisions per hour in the occupied resource estimated or measured by the AP#1 111 is more than a particular threshold; and when the mobility of the AP#1 111 is more than a particular threshold.

A method for collecting the information on the neighbor AP#2 121 may be exchange of a probe request frame and a probe response frame as described above in the relevant figures or may be otherwise any other methods using any signals allowing the STA# and the AP to collect and exchange information, for example, ANQP by which the STA and the AP may communicate information even without an association.

The AP#1 111 sending a request for collecting the information or providing the collected information need not be inevitably a WLAN AP or may otherwise be another STA to which the STA#1 113 is linked, an evolved node b (eNB) or worldwide interoperability for microwave access (WiMAX) base station following a 3GPP standard enabling communication with the STA#1 113, or any terminal or WiMAX terminal following a 3GPP standard, or any terminal communicable with the STA#1 113.

An example of a procedure for performing data communication with the neighbor AP while simultaneously performing data communication in a home BSS using different antennas and base-band processing units in the WLAN system supportive of multiple antennas according to an embodiment of the present disclosure has been described above in connection with FIG. 10. Another example of a procedure for performing data communication with the neighbor AP while simultaneously performing data communication in a home BSS using different antennas, a base-band processing units including multiple antennas, or a modem including multiple antennas and a base-band processing unit in the WLAN system supportive of multiple antennas according to an embodiment of the present disclosure is described below in connection with FIG. 11.

Figure 11:
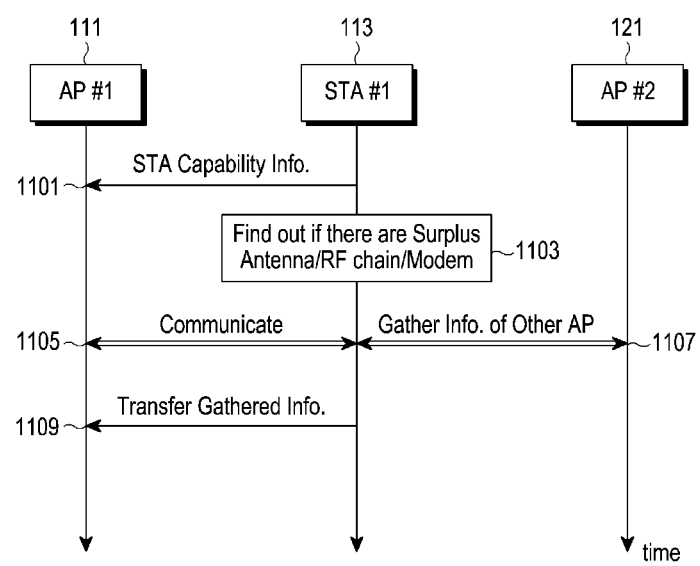
FIG. 11 is a view schematically illustrating an example of a data communication procedure between an STA and a neighbor AP as performed in a WLAN system supportive of multiple antennas according to an embodiment of the present disclosure.

FIG. 11 is a view schematically illustrating an example of a data communication procedure between an STA and a neighbor AP as performed in a WLAN system supportive of multiple antennas according to an embodiment of the present disclosure.

Referring to FIG. 11, an STA#1 113 is an STA that is connected with an AP#1 111 and is present within a same BSS. The STA#1 113 provides the AP#1 111 with information on its possessing multiple antennas or a base-band processing units including multiple antennas or a modem including multiple antennas and a base-band processing unit when accessing the BSS, when the network requests to provide information, or when a particular condition is met at operation 1101. When the particular condition is thereafter met at some time, the STA#1 113 determines to collect the information on the neighbor AP using some of its possessing antennas, base-band processing units including antennas, or modems including antennas and base-band processing units at operation 1103. Thereafter, the STA#1 113 continues to perform data communication with the AP#1 111 using the antennas, base-band processing units including antennas, or modems including antennas and base-band processing units to be used in data communication with the AP#1 111 as determined in operation 1103 at operation 1105. The STA#1 113 simultaneously collects the information on the neighbor AP, for example, the AP#2 121, using the antennas, base-band processing units including antennas, or modems including antennas and base-band processing units to be used for data communication with the AP#2 121 as determined in operation 1103 at operation 1107. The STA#1 113 thereafter transfers the collected information to the AP#1 111 at operation 1109.

The particular condition considered in operation 1103 may be designated by various methods. For example, the AP#1 111 or the AP#2 121 may make a request for the same by sending some frame to the STA#1 113. Or, the particular condition may be some condition that has been previously known by the AP#1 111 or shared when the STA#1 113 accesses the network. The condition may also be determined by the channel or network circumstance estimated or measured by the STA#1 113. In a specific example, there may be included some of the conditions of, for example, when the SINR measured or estimated by the STA#1 113 is less than a particular threshold; when a ratio of channel occupancy by a corresponding network measured or estimated by the STA#1 113 is less than a particular threshold; a noise strength, a ratio of channel occupancy by another network, the number of STAs in network, a network load, or the probability of transmission failure/collision of the STAs estimated or measured by the AP#1 111 is more than a particular threshold; when the number of collisions or average number of collisions per hour in the occupied resource estimated or measured by the AP#1 111 is more than a particular threshold; and when the mobility of the AP#1 111 is more than a particular threshold.

A method for collecting the information on neighbor the AP#2 121 may be exchange of a probe request frame and a probe response frame as described above in the relevant figures or may be otherwise any other methods using any signals allowing the STA# and the AP to collect and exchange information, for example, ANQP by which the STA and the AP may communicate information even without an association.

The AP#1 111 sending a request for collecting the information or providing the collected information need not be inevitably a WLAN AP or may otherwise be another STA to which the STA#1 113 is linked, an eNB or WiMAX base station following a 3GPP standard enabling communication with the STA#1 113, or any terminal or WiMAX terminal following a 3GPP standard, or any terminal communicable with the STA#1 113.

An example of a procedure for performing data communication with the neighbor AP while simultaneously performing data communication in a home BSS using different antennas and base-band processing units in the WLAN system supportive of multiple antennas according to an embodiment of the present disclosure has been described above in connection with FIG. 11. Another example of a procedure for performing data communication with the AP while simultaneously performing data communication in a home BSS using different antennas, a base-band processing units including multiple antennas, or a modem including multiple antennas and a base-band processing unit in the WLAN system supportive of multiple antennas according to an embodiment of the present disclosure and varying the home BSS protocol are described below in connection with FIG. 12.

Figure 12:
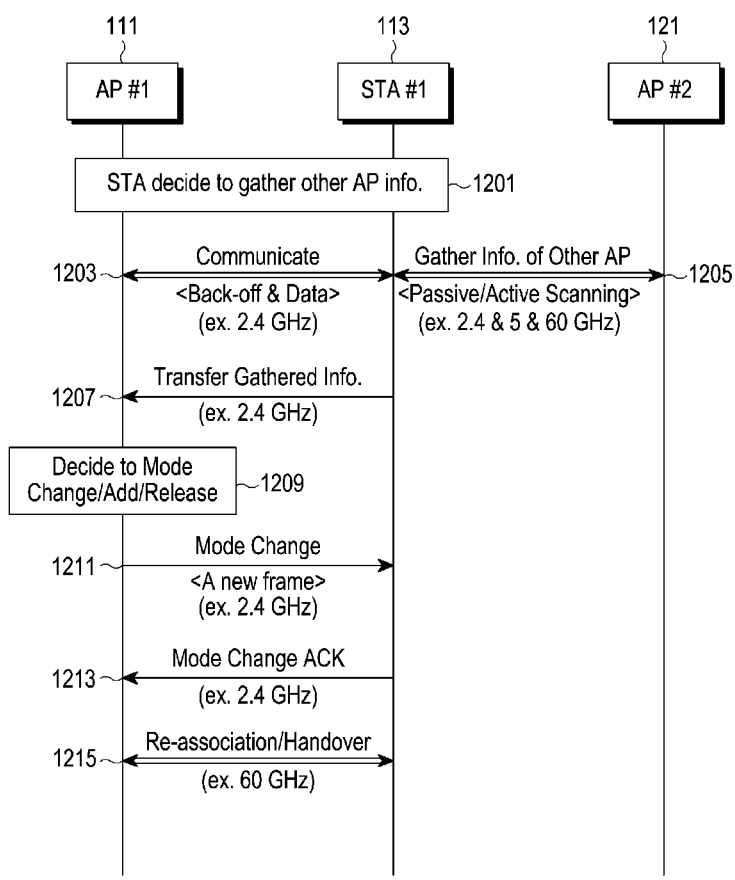
FIG. 12 is a view schematically illustrating an example of a data communication procedure between an STA and a neighbor AP as performed in a WLAN system supportive of multiple antennas according to an embodiment of the present disclosure.

FIG. 12 is a view schematically illustrating an example of a data communication procedure between an STA and a neighbor AP as performed in a WLAN system supportive of multiple antennas according to an embodiment of the present disclosure.

Referring to FIG. 12, an STA#1 113 is an STA that is connected with an AP#1 111 and is present within a same BSS. When the particular condition is met at some time or when receiving an information collection request message from the AP#1 111, the STA#1 113 determines to collect the information on the neighbor AP using some of its possessing antennas, base-band processing units including antennas, or modems including antennas and base-band processing units at operation 1201. Thereafter, the STA#1 113 continues to perform data communication with the AP#1 111 using the antennas, base-band processing units including antennas, or modems including antennas and base-band processing units to be used in data communication with the AP#1 111 as determined in operation 1201 at operation 1203. The STA#1 113 simultaneously collects the information on the neighbor AP, for example, the AP#2 121, using the antennas, base-band processing units including antennas, or modems including antennas and base-band processing units to be used for data communication with the AP#2 121 as determined in operation 1201 at operation 1205. The STA#1 113 thereafter transfers the collected information to the AP#1 111 at operation 1207. The AP#1 111 may change, add, or reduce the operation protocol and frequency band of the BSS being managed by the AP#1 111 using the information on the AP#2 121 collected from the STA#1 113, other information collected from other STAs, and information measured by the AP#1 111 itself. When the protocol and frequency band (e.g., IEEE 802.11b or n protocol adopting 2.4 GHz) currently in use are observed or predicted to be deteriorated in performance or when there are other protocols and frequency bands (e.g., IEEE 802.1 lad protocol adopting 60 GHz) that may present better performance at a higher level than that, the overall BSS may be determined to shift to the protocol at operation 1209, and mode change frames containing such request may be unicast or broadcast to the STAs within the BSS at operation 1211. When such frames require an acknowledgement (ACK), the STAs successfully receiving the frames may send ACKs to the AP#1

111 at operation 1213. When successfully receiving mode change ACKs from all the STAs in the BSS, the AP#1 111 may conduct re-association or handover to the new protocol with each station at operation 1215.

The mode change frames transmitted in operation 1211 may be frames not requiring an ACK, for example, beacon frames, and in such case, the operation 1213 in which the AP#1 111 receives an ACK from each station may be omitted.

Upon failure to receive ACKs from some stations in operation 1213, the AP#1 111 may re-transmit the mode change frames to the stations or all the stations at operation 1211, change modes only for the stations having received the ACKs, or abandon the mode change and inform such abandonment to all the stations or stations having sent the ACKs.

The particular condition at operation 1201 may be designated by various methods. For example, the AP#1 111 or the AP#2 121 may make a request for the same by sending some frame to the STA#1 113. Or, the particular condition may be some condition that has been previously known by the AP#1 111 or shared when the STA#1 113 accesses the network. The condition may also be determined by the channel or network circumstance estimated or measured by the STA#1 113. In a specific example, there may be included some of the conditions of, for example, when the SNR measured or estimated by the STA#1 113 is less than a particular threshold; when a ratio of channel occupancy by a corresponding network measured or estimated by the STA#1 113 is less than a particular threshold; a noise strength, a ratio of channel occupancy by another network, the number of STAs in network, a network load, or the probability of transmission failure/collision of the STAs estimated or measured by the AP#1 111 is more than a particular threshold; when the number of collisions or average number of collisions per hour in the occupied resource estimated or measured by the AP#1 111 is more than a particular threshold; and when the mobility of the AP#1 111 is more than a particular threshold.

A method for collecting the information on neighbor the AP#2 121 may be exchange of a probe request frame and a probe response frame as described above in the relevant figures or may be otherwise any other methods using any signals allowing the STA# and the AP to collect and exchange information, for example, ANQP by which the STA and the AP may communicate information even without an association.

The AP#1 111 sending a request for collecting the information or providing the collected information need not be inevitably a WLAN AP or may otherwise be another STA to which the STA#1 113 is linked, an eNB or WiMAX base station following a 3GPP standard enabling communication with the STA#1 113, or any terminal or WiMAX terminal following a 3GPP standard, or any terminal communicable with the STA#1 113.

An example of a procedure for STA and APs performing data communication with the neighbor AP while simultaneously performing data communication in a home BSS using different antennas and base-band processing units in the WLAN system supportive of multiple antennas according to an embodiment of the present disclosure has been described above in connection with FIG. 12. Another example of a procedure for performing data communication with the AP while simultaneously performing data communication in a home BSS using different antennas, a base-band processing units including multiple antennas, or a modem including multiple antennas and a base-band processing unit in the WLAN system supportive of multiple antennas according to an embodiment of the present disclosure and varying the home BSS protocol are described below in connection with FIG. 13.

Figure 13:
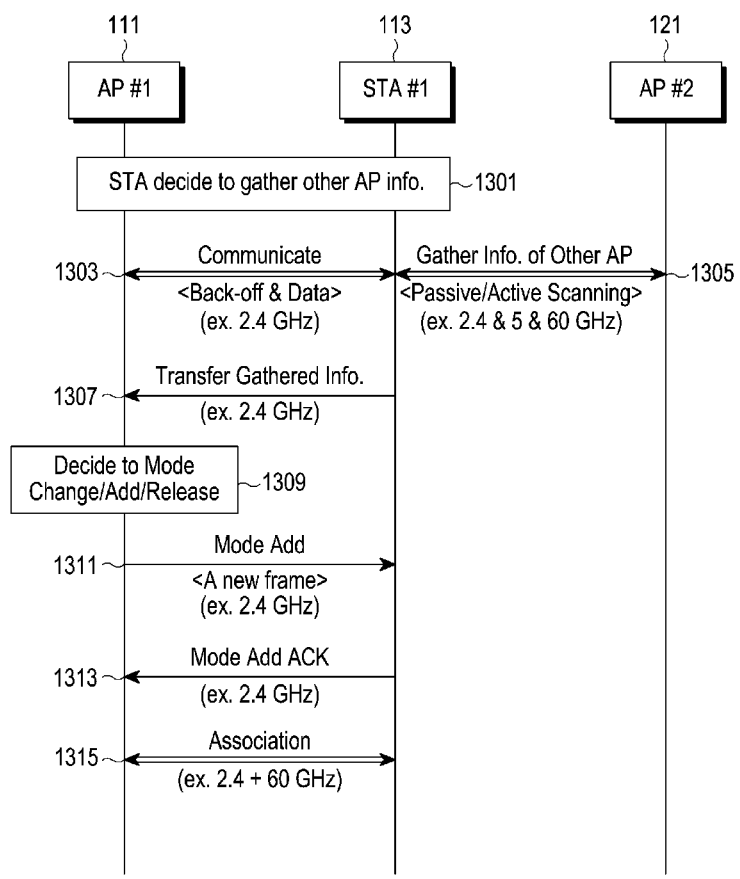
FIG. 13 is a view schematically illustrating an example of a data communication procedure between an STA and a neighbor AP as performed in a WLAN system supportive of multiple antennas according to an embodiment of the present disclosure.

FIG. 13 is a view schematically illustrating an example of a data communication procedure between an STA and a neighbor AP as performed in a WLAN system supportive of multiple antennas according to an embodiment of the present disclosure.

Referring to FIG. 13, an STA#1 113 is an STA that is connected with an AP#1 111 and is present within a same BSS. When the particular condition is met at some time or when receiving an information collection request message from the AP#1 111, the STA#1 113 determines to collect the information on the neighbor AP using some of its possessing antennas, base-band processing units including antennas, or modems including antennas and base-band processing units at operation 1301. Thereafter, the STA#1 113 continues to perform data communication with the AP#1 111 using the antennas, base-band processing units including antennas, or modems including antennas and base-band processing units to be used in data communication with the AP#1 111 as determined in operation 1301 at operation 1303. The STA#1 113 simultaneously collects the information on the neighbor AP, for example, the AP#2 121, using the antennas, base-band processing units including antennas, or modems including antennas and base-band processing units to be used for data communication with the AP#2 121 as determined in operation 1301 at operation 1305. The STA#1 113 thereafter transfers the collected information to the AP#1 111 at operation 1307. The AP#1 111 may change, add, or reduce the operation protocol and frequency band of the BSS being managed by the AP#1 111 using the information on the AP#2 121 collected from the STA#1 113 in operation 1309, other information collected from other STAs, and information measured by the AP#1 111 itself. When the protocol and frequency band (e.g., IEEE 802.11b or n protocol adopting 2.4 GHz) currently in use are observed or predicted to be deteriorated in performance or when there are other protocols and frequency bands that may add to the protocol and frequency band currently in use, for example, other protocol and frequency band now infrequent in use (e.g., IEEE 802.11ad protocol adopting 60 GHz), the protocol and frequency band may be determined to be used in addition to the protocol and frequency band being currently used by the BSS, and mode add frames containing such request may be unicast or broadcast to the STAs within the BSS at operation 1311. When such frames require an ACK, the STAs successfully receiving the frames may send ACKs to AP at operation 1313. When successfully receiving the mode add ACKs from all the STAs in the BSS, the AP#1 111 may conduct an association process for allowing each station to access the new protocol or bandwidth of the AP#1 111 so that each station may additionally use the new protocol or bandwidth at operation 1315.

The mode add frames transmitted in operation 1311 may be frames not requiring an ACK, for example, beacon frames, and in such case, the operation 1313 in which the AP#1 111 receives an ACK from each station may be omitted.

Upon failure to receive ACKs from some stations in operation 1313, the AP#1 111 may re-transmit the mode add frames to the stations or all the stations at operation 1311, add modes only for the stations having received the ACKs, or abandon the mode addition and inform such abandonment to all the stations or stations having sent the ACKs.

The particular condition at operation 1301 may be designated by various methods. For example, the AP#1 111 or the AP#2 121 may make a request for the same by sending some frame to the STA#1 113. Or, the particular condition may be some condition that has been previously known by the AP#1 111 or shared when the STA#1 113 accesses the network. The condition may also be determined by the channel or network circumstance estimated or measured by the STA#1 113. In a specific example, there may be included some of the conditions of, for example, when the SNR measured or estimated by the STA#1 113 is less than a particular threshold; when a ratio of channel occupancy by a corresponding network measured or estimated by the STA#1 113 is less than a particular threshold; a noise strength, a ratio of channel occupancy by another network, the number of STAs in network, a network load, or the probability of transmission failure/collision of the STAs estimated or measured by the AP#1 111 is more than a particular threshold; when the number of collisions or average number of collisions per hour in the occupied resource estimated or measured by the AP#1 111 is more than a particular threshold; and when the mobility of the AP#1 111 is more than a particular threshold.

A method for collecting the information on the neighbor AP#2 121 may be exchange of a probe request frame and a probe response frame as described above in the relevant figures or may be otherwise any other methods using any signals allowing the STA# and the AP to collect and exchange information, for example, ANQP by which the STA and the AP may communicate information even without an association.

The AP#1 111 sending a request for collecting the information or providing the collected information need not be inevitably a WLAN AP or may otherwise be another STA to which the STA#1 113 is linked, an eNB or WiMAX base station following a 3GPP standard enabling communication with the STA#1 113, or any terminal or WiMAX terminal following a 3GPP standard, or any terminal communicable with the STA#1 113.

The AP#1 111 sending a request for collecting the information or providing the collected information need not be inevitably a WLAN AP or may otherwise be another STA to which the STA#1 113 is linked, an eNB or WiMAX base station following a 3GPP standard enabling communication with the STA#1 113, or any terminal or WiMAX terminal following a 3GPP standard, or any terminal communicable with the STA#1 113.

An example of a procedure for STA and APs performing data communication with the neighbor AP while simultaneously performing data communication in a home BSS using different antennas and base-band processing units in the WLAN system supportive of multiple antennas according to an embodiment of the present disclosure has been described above in connection with FIG. 13. An example of a procedure for the STA and APs performing data communication with the AP while simultaneously performing data communication in a home BSS using different antennas, a base-band processing units including multiple antennas, or a modem including multiple antennas and a base-band processing unit in the WLAN system supportive of multiple antennas according to an embodiment of the present disclosure and varying the home BSS protocol using the same are described below in connection with FIG. 14.

Figure 14:
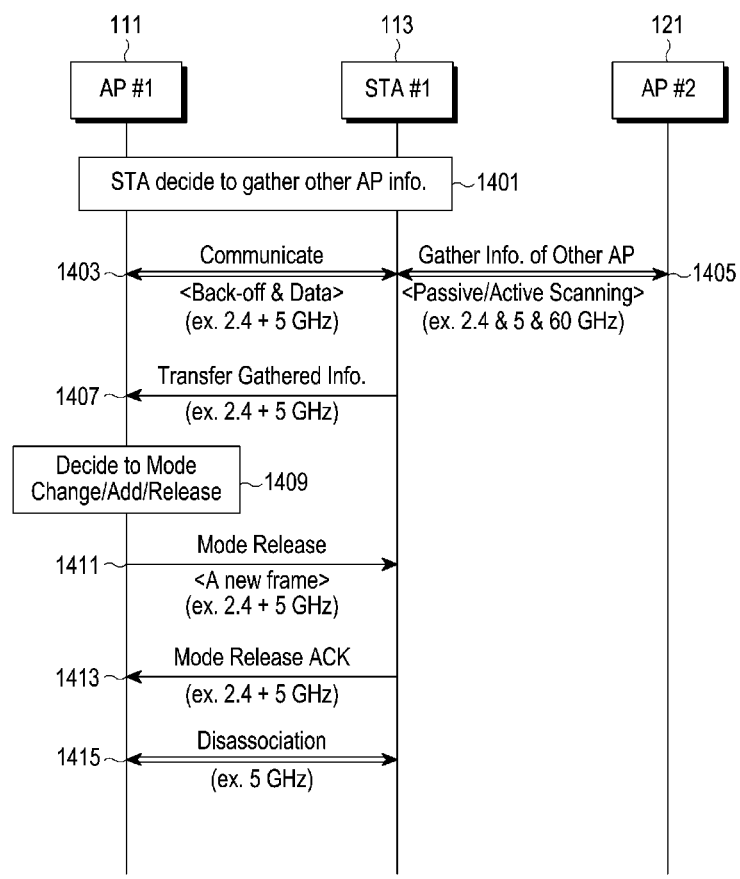
FIG. 14 is a view schematically illustrating an example of a data communication procedure between an STA and a neighbor AP as performed in a WLAN system supportive of multiple antennas according to an embodiment of the present disclosure.

FIG. 14 is a view schematically illustrating an example of a data communication procedure between an STA and a neighbor AP as performed in a WLAN system supportive of multiple antennas according to an embodiment of the present disclosure.

Referring to FIG. 14, an STA#1 113 is an STA that is connected with an AP#1 111 and is present within a same BSS. When the particular condition is met at some time or when receiving an information collection request message from the AP#1 111, the STA#1 113 determines to collect the information on the neighbor AP using some of its possessing antennas, base-band processing units including antennas, or modems including antennas and base-band processing units at operation 1401. Thereafter, the STA#1 113 continues to perform data communication with AP#1 111 using the antennas, base-band processing units including antennas, or modems including antennas and base-band processing units to be used in data communication with the AP#1 111 as determined in operation 1401 at operation 1403. The STA#1 113 simultaneously collects the information on the neighbor AP, for example, the AP#2 121, using the antennas, base-band processing units including antennas, or modems including antennas and base-band processing units to be used for data communication with the AP#2 121 as determined in operation 1401 at operation 1405. The STA#1 113 thereafter transfers the collected information to the AP#1 111 at operation 1407. The AP#1 111 may change, add, or reduce the operation protocol and frequency band of the BSS being managed by the AP#1 111 using the information on the AP#2 121 collected from the STA#1 113, other information collected from other STAs, and information measured by the AP#1 111 itself. When part of the protocol and frequency band (e.g., IEEE 802.11b or n protocol adopting 2.4 GHz) currently in use are observed or predicted to be deteriorated in performance or when there are protocols and frequency bands that may be removed from the protocols and frequency bands currently in use, for example, protocols and frequency bands where the channel occupancy by other BSS is currently too high and thus the BSS of the AP#1 111 shows a reduced use rate (e.g., IEEE 802.11n or ac protocol adopting 5 GHz), the protocols and frequency bands among the protocols and frequency bands being now used by the BSS may be determined to be removed at operation 1409, and mode release frames containing such request may be unicast or broadcast to the STAs within the BSS at operation 1411. When such frames require an ACK, the STAs successfully receiving the frames may send ACKs to the AP#1 111 at operation 1413. When successfully receiving mode release ACKs from all the STAs in the BSS, the AP#1 111 may conduct a process (disassociation) for stopping using the protocols or bandwidths with each station at operation 1415.

The mode release frames transmitted in operation 1411 may be frames not requiring an ACK, for example, beacon frames, and in such case, the operation 1413 in which AP#1 111 receives an ACK from each station may be omitted.

Upon failure to receive ACKs from some stations in operation 1413, the AP#1 111 may re-transmit the mode release frames to the stations or all the stations at operation 1411, add modes only for the stations having received the ACKs, or abandon the mode addition and inform such abandonment to all the stations or stations having sent the ACKs.

The particular condition at operation 1401 may be designated by various methods. For example, the AP#1 111 or the AP#2 121 may make a request for the same by sending some frame to the STA#1 113. Or, the particular condition may be some condition that has been previously known by the AP#1 111 or shared when STA#1 113 accesses the network. The condition may also be determined by the channel or network circumstance estimated or measured by the STA#1 113. In a specific example, there may be included some of the conditions of, for example, when the SNR measured or estimated by the STA#1 113 is less than a particular threshold; when a ratio of channel occupancy by a corresponding network measured or estimated by the STA#1 113 is less than a particular threshold; a noise strength, a ratio of channel occupancy by another network, the number of STAs in network, a network load, or the probability of transmission failure/collision of the STAs estimated or measured by the AP#1 111 is more than a particular threshold; when the number of collisions or average number of collisions per hour in the occupied resource estimated or measured by the AP#1 111 is more than a particular threshold; and when the mobility of the AP#1 111 is more than a particular threshold.

A method for collecting the information on neighbor the AP#2 121 may be exchange of a probe request frame and a probe response frame as described above in the relevant figures or may be otherwise any other methods using any signals allowing the STA# and the AP to collect and exchange information, for example, ANQP by which the STA and the AP may communicate information even without an association.

The AP#1 111 sending a request for collecting the information or providing the collected information need not be inevitably a WLAN AP or may otherwise be another STA to which the STA#1 113 is linked, an eNB or WiMAX base station following a 3GPP standard enabling communication with the STA#1 113, or any terminal or WiMAX terminal following a 3GPP standard, or any terminal communicable with the STA#1 113.

An example of a procedure for STA and APs performing data communication with the neighbor AP while simultaneously performing data communication in a home BSS using different antennas and base-band processing units in the WLAN system supportive of multiple antennas according to an embodiment of the present disclosure has been described above in connection with FIG. 14. An example of a procedure for the STA and APs performing data communication with the AP while simultaneously performing data communication in a home BSS using different antennas, a base-band processing units including multiple antennas, or a modem including multiple antennas and a base-band processing unit in the WLAN system supportive of multiple antennas according to an embodiment of the present disclosure and a method for collecting information on the home AP using the same are described below in connection with FIG. 15.

Figure 15:
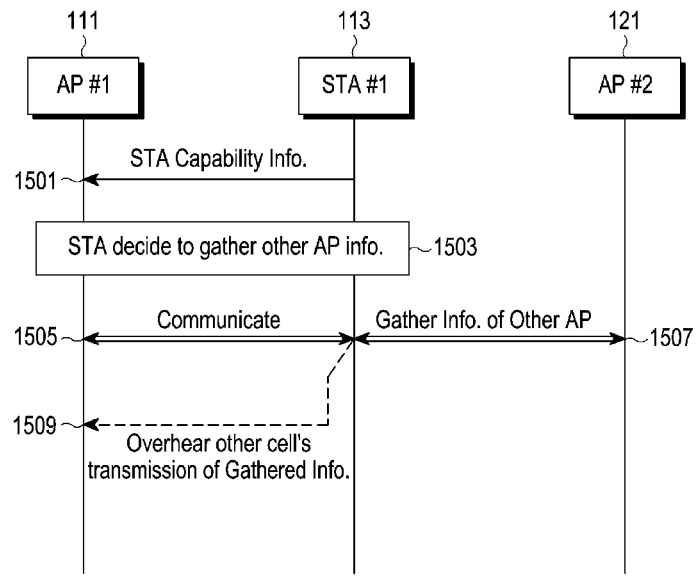
FIG. 15 is a view schematically illustrating an example of a data communication procedure between an STA and a neighbor AP as performed in a WLAN system supportive of multiple antennas according to an embodiment of the present disclosure.

FIG. 15 is a view schematically illustrating an example of a data communication procedure between an STA and a neighbor AP as performed in a WLAN system supportive of multiple antennas according to an embodiment of the present disclosure.

Referring to FIG. 15, an STA#1 113 is an STA that is connected with an AP#1 111 and is present within a same BSS. The STA#1 113 provides the AP#1 111 with information on its possessing multiple antennas or a base-band processing units including multiple antennas or a modem including multiple antennas and a base-band processing unit when accessing the BSS, when the network requests to provide information, or when a particular condition is met at operation 1501. When the particular condition is met at some time or when receiving an information collection request message from the AP#1 111, the STA#1 113 determines to collect the information on the neighbor AP using some of its possessing antennas, base-band processing units including antennas, or modems including antennas and base-band processing units at operation 1503. Thereafter, the STA#1 113 continues to perform data communication with the AP#1 111 using the antennas, base-band processing units including antennas, or modems including antennas and base-band processing units to be used in data communication with the AP#1 111 as determined in operation 1503 at operation 1505. The STA#1 113 simultaneously collects the information on the neighbor AP, for example, the AP#2 121, using the antennas, base-band processing units including antennas, or modems including antennas and base-band processing units to be used for data communication with the AP#2 121 as determined in operation 1503 at operation 1507. If the AP#1 111 is positioned where the AP#1 111 may receive information from the AP#2 121 in the STA#1 113, when the destination address of the frame transmitted from an AP or STA belonging to another neighbor BSS is the address of an STA belonging to its BSS, it may receive and decode the frame to thereby receive the information that the neighbor cell intends to send at operation 1509.

The particular condition at operation 1503 may be designated by various methods. For example, the AP#1 111 or the AP#2 121 may make a request for the same by sending some frame to the STA#1 113. Or, the particular condition may be some condition that has been previously known by the AP#1 111 or shared when the STA#1 113 accesses the network. The condition may also be determined by the channel or network circumstance estimated or measured by the STA#1 113. In a specific example, there may be included some of the conditions of, for example, when the SNR measured or estimated by the STA#1 113 is less than a particular threshold; when a ratio of channel occupancy by a corresponding network measured or estimated by the STA#1 113 is less than a particular threshold; a noise strength, a ratio of channel occupancy by another network, the number of STAs in network, a network load, or the probability of transmission failure/collision of the STAs estimated or measured by the AP#1 111 is more than a particular threshold; when the number of collisions or average number of collisions per hour in the occupied resource estimated or measured by the AP#1 111 is more than a particular threshold; and when the mobility of the AP#1 111 is more than a particular threshold.

A method for collecting the information on the neighbor AP#2 121 may be exchange of a probe request frame and a probe response frame as described above in the relevant figures or may be otherwise any other methods using any signals allowing the STA# and the AP to collect and exchange information, for example, ANQP by which the STA and the AP may communicate information even without an association.

The AP#1 111 sending a request for collecting the information or providing the collected information need not be inevitably a WLAN AP or may otherwise be another STA to which the STA#1 113 is linked, an eNB or WiMAX base station following a 3GPP standard enabling communication with the STA#1 113, or any terminal or WiMAX terminal following a 3GPP standard, or any terminal communicable with the STA#1 113.

An example of a procedure for the STA and APs performing data communication with the neighbor AP while simultaneously performing data communication in a home BSS using different antennas and base-band processing units in the WLAN system supportive of multiple antennas according to an embodiment of the present disclosure has been described above in connection with FIG. 15.

There may be STA pairs performing inter-station communication (peer-to-peer (P2P)) under the OBSS environment where multiple APs and STAs co-exist. In the environment where such STA pair uses the same channel as a neighbor AP, communication between the STA pair and the neighbor AP may also be rendered possible by the above-described embodiments.

Figure 16:
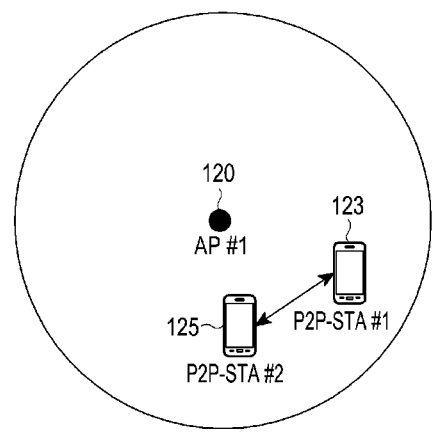
FIG. 16 is a view illustrating an example of an environment with a neighbor AP and STAs performing inter-station communication in a WLAN system supportive of multiple antennas according to an embodiment of the present disclosure.

FIG. 16 illustrates an example of an environment where there are stations performing P2P communication and a neighbor AP according to an embodiment of the present disclosure.

Referring to FIG. 16, an STA#1 123 and an STA#2 125 mutually communicate data through P2P communication, and an AP#1 120 is present in a nearby area. Under such environment, when the channel used by the STA#1 123 and the STA#2 125 attempts to be changed due to some condition, the STAs may send a request for channel scanning to the AP.

The condition under which the STA#1 123 or the STA#2 125 sends the request for channel scanning to the AP#1 120 includes when the data transmission rate (Rate) of the STA#1 123 or the STA#2 125 becomes not more than a threshold, when the data transmitted or received by the STA#1 123 or the STA#2 125 is encountered with a predetermined number of errors or more, or when the strength of an interference signal from other STA or AP around the STA#1 123 or the STA#2 125 is not less than a threshold.

The condition under which the STA#1 123 or the STA#2 125 sends the request for channel scanning to the AP#1 120 may be designated by various methods. For example, there may be included some of the conditions of, for example, when the data transmission speed (Rate) or the SINR measured or estimated by the STA#1 123 or the STA#2 125 is less than a particular threshold; when a ratio of channel occupancy by a corresponding network, a noise strength, a ratio of channel occupancy by another network, the number of STAs in network, a network load, or the probability of transmission failure/collision of the STAs measured or estimated by the STA#1 123 or the STA#2 125 is more than a particular threshold; when the number of collisions or average number of collisions per hour in the occupied resource estimated or measured by the STA#1 123 or the STA#2 125 is more than a particular threshold; and when the mobility of the STA#1 123 or the STA#2 125 is more than a particular threshold.

Upon reception of the scanning request, the AP may scan other available channels, choose channels from which P2P STAs are estimated to obtain a good performance after shifting to the channels to create a channel list, and provides the channel list to the STAs. The STAs scan the channels in the received channel list and select and shift to an optimal channel. By using the AP's scanning support as proposed, the STAs need not monitor all of the channels, saving the STAs power consumption.

An example of data communication between stations and a neighbor AP performing P2P communication in the WLAN system supportive of multiple antennas according to an embodiment of the present disclosure has been described above with reference to FIG. 16. An example of a specific transmission procedure for data communication between STAs and a neighbor AP performing P2P communication in the WLAN system supportive of multiple antennas according to an embodiment of the present disclosure is now described below with reference to FIG. 17.

Figure 17:
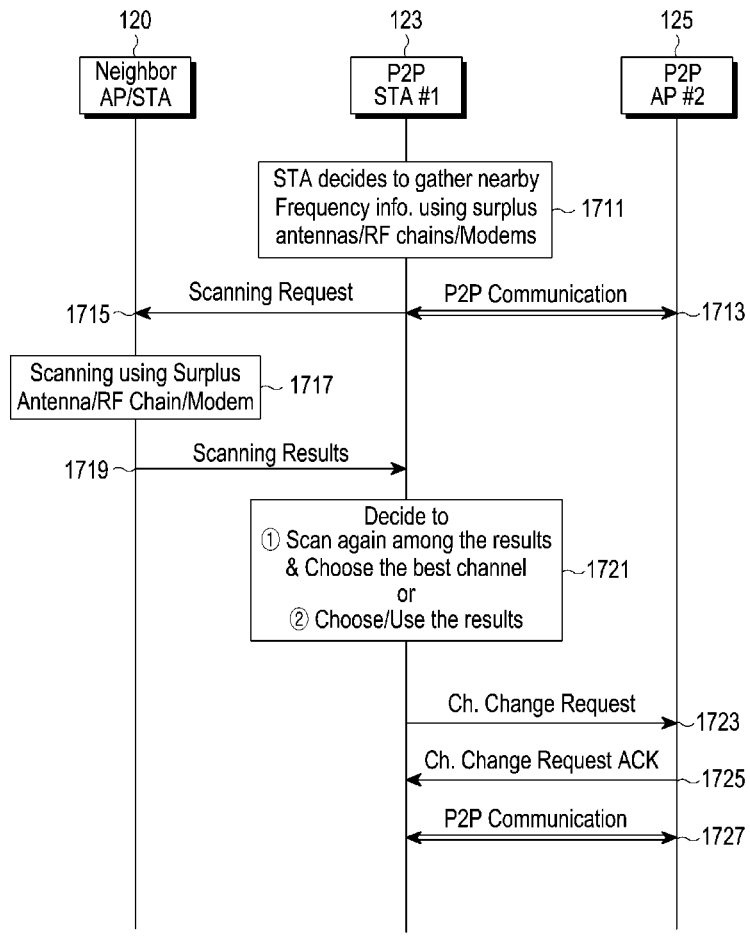
FIG. 17 is a view schematically illustrating an example of a data communication procedure between an STA and a neighbor AP as performed in a WLAN system supportive of multiple antennas according to an embodiment of the present disclosure.

FIG. 17 is a view schematically illustrating an example of a data communication procedure between an STA and a neighbor AP as performed in a WLAN system supportive of multiple antennas according to an embodiment of the present disclosure.

Referring to FIG. 17, a P2P STA#1 123 is a P2P communication STA connected with another P2P STA#2 125 to exchange information. When a particular condition is met at a particular time, the P2P STA#1 123 determines to request a neighbor AP#1 120 to collect information on the neighbor network, for example, a frequency or channel occupancy ratio, user count, transmission success rate, transmission failure rate, SINR, and RSSI, using some of its possessing antennas, base-band processing units including antennas, or modems including antennas and base-band processing units at operation 1711. Thereafter, the P2P STA#1 123 continues to perform data communication with the P2P STA#2 125 using the antennas, base-band processing units including antennas, or modems including antennas and base-band processing units to be used in data communication with neighbor the AP#1 120 as determined in operation 1711 at operation 1713. The STA#1 123 simultaneously requests to collect the information on the neighbor AP#1 120, using the antennas, base-band processing units including antennas, or modems including antennas and base-band processing units to be used for data communication with the neighbor AP#1 120 as determined in operation 1711 at operation 1715.

Upon reception of the information collection request from the neighbor P2P STA#1 123, the neighbor AP#1 120 may select surplus antennas, base-band processing units including antennas, or modems including antennas and base-band processing units among its possessing antennas, base-band processing units including antennas, or modems including antennas and base-band processing units to collect the neighbor AP information at operation 1717 or may collect the information using its possessing antennas, base-band processing units including antennas, or modems including antennas and base-band processing units without performing information transmission for a particular time. The neighbor AP#1 120 may provide the whole or part of the collected neighbor AP information to the P2P STA#1 123 at operation 1719. The P2P STA#1 123 having collected the information from the neighbor AP#1 120 may select restrictive frequency resources or time resources using such information to efficiently scan the information on its neighbor AP and to select an optimal frequency or may select the optimal frequency utilizing the information received from the neighbor AP#1 120. The P2P STA#1 123 may unicast or broadcast, to the P2P STA#2 125, a channel change request frame containing information indicating that the current communication frequency is changed to the optimal frequency selected in operation 1721 at operation 1723. When the channel change request frame requires an ACK, the P2P STA#2 125 successfully receiving the frame may send an ACK to the P2P AP#1 123 at operation 1725. When successfully receiving the ACK from the P2P STA#2 125, the P2P STA#1 123 may perform the operation of changing frequency channels with the P2P STA#2 125 and information transmission at operation 1727.

The channel change request frame transmitted in operation 1723 may be a frame not requiring an ACK, for example, a beacon frame, and in such case, the operation 1725 in which the P2P STA#1 123 receives the ACK may be omitted.

Upon failing to receive ACKs from some STAs in operation 1725, the P2P STA#1 123 may re-transmit channel change request frames to the corresponding STAs or all the STAs at operation 1723 or may abandon the channel change.

The particular condition used in operation 1711 may be designated by various methods. For example, the P2P STA#2 125 or the neighbor AP#1 120 may make a request for the same by sending some frame to the P2P STA#1 123. Or, the particular condition may be some condition that has been previously known by neighbor the AP#1 120 or shared when the P2P STA#1 123 accesses the P2P STA#2 125. The condition may also be determined by the channel or network circumstance estimated or measured by the P2P STA#1 123. In a specific example, there may be included some of the conditions of, for example, when the SINR measured or estimated by the P2P STA#1 123 is less than a particular threshold; when a ratio of channel occupancy by a corresponding network measured or estimated by the P2P STA#1 123 is less than a particular threshold; a noise strength, a ratio of channel occupancy by another network, the number of STAs in network, a network load, or the probability of transmission failure/collision of the STAs is more than a particular threshold; when the number of collisions or average number of collisions per hour in the occupied resource estimated or measured by the P2P STA#1 123 is more than a particular threshold; and when the mobility of the P2P STA#1 123 is more than a particular threshold.

A method for collecting the neighbor AP information by the neighbor AP#1 120 may be exchange of a probe request frame and a probe response frame with other neighbor AP or STAs as described above in the relevant figures or may be otherwise any other methods using any signals allowing the STA# and the AP to collect and exchange information, for example, ANQP by which the STA and the AP may communicate information even without an association.

An example of a specific transmission communication procedure for data communication between stations and a neighbor AP performing P2P communication in the WLAN system supportive of multiple antennas according to an embodiment of the present disclosure has been described above with reference to FIG. 17. An example of an operational process by an STA in the WLAN system supportive of multiple antennas according to an embodiment of the present disclosure is now described below with reference to FIG. 18.

Figure 18:
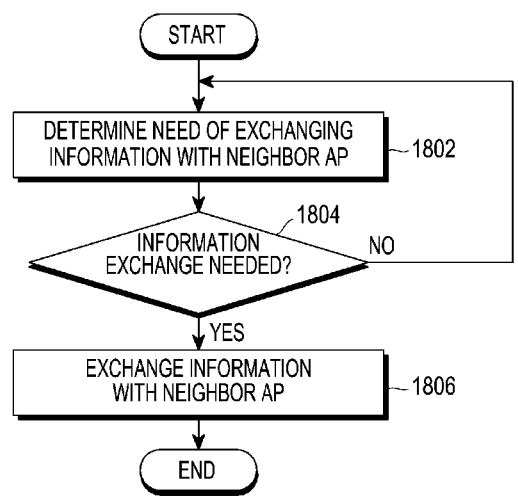
FIG. 18 is a flowchart schematically illustrating an operation of an STA in a WLAN system supportive of multiple antennas according to an embodiment of the present disclosure.

FIG. 18 is a flowchart schematically illustrating an operation of an STA in a WLAN system supportive of multiple antennas according to an embodiment of the present disclosure.

Referring to FIG. 18, the STA first identifies whether there is the need of communicating data with a neighbor AP at operation 1802. Conditions for the determination may be designated by various methods. For example, the conditions may be requested by the AP sending some frame to the STA or may be determined by a channel or network circumstance measured or estimated by the STA. In a specific example, there may be included some of the conditions of, for example, when the SNR measured or estimated by the STA is less than a particular threshold; when a ratio of channel occupancy by a corresponding network measured or estimated by the STA is less than a particular threshold; when a noise strength, a ratio of channel occupancy by another network, the number of STAs in network, a network load, or the probability of transmission failure/collision of the STAs is more than a particular threshold; when the number of collisions or average number of collisions per hour in the occupied resource estimated or measured by the STA is more than a particular threshold; when a difference in received signal strength between the neighbor AP and the network where it belongs as estimated or measured by the STA is more than a particular threshold; when the AP of the BSS where it belongs requests to communicate or collect data; and when the mobility of the STA is more than a particular threshold. If the STA is a station including multiple antennas and multiple base-band and RF processing chains, the case where there are remaining antennas and base-band and RF processing chains even though the data transmission in communication with the AP, which is a home AP, meets requirements for data traffic may also be included in the conditions for starting communication to collect information from the neighbor AP using such surplus antennas and base-band and RF processing chains.

As a result identified, the STA determines whether there is the need of communicating data with the neighbor AP at operation 1804. When there is the need of communicating data with the neighbor AP, the STA communicates data with the neighbor AP at operation 1806. Unless there is the need of communicating data with the neighbor AP, the STA waits until a determination as to whether data communication is required arises.

In operation 1806, the STA collects data related to the neighbor AP with which it intends to communicate data, carries the same on a probe request message to send to the neighbor AP, and starts a data communication procedure. The data communication procedure performed in operation 1806 may be one of the above embodiments. The data communicable by the STA and the neighbor AP may include data items enabling the estimation of the degree of interference influencing them, for example, some of an RSSI, an SINR, and a beamforming index as shown in FIG. 21. The data may further include data items that may assist in the AP operating resources, including some of, for example, resource reservation data (TXOP reservation info.) of each network, a TBTT), and time of stopping communication for scanning a next channel (Next scanning gap info.). The data may further include data items useful to select variables for changing channels and setting up an environment, including some of, for example, data for grasping the capability of each AP (capability information), load (or queue length) of each AP, number of stations active in the network, and service data supportable by each BSS. The data may further include data items useful to select variables for syncing between the BSSs, including some of, for example, frequency offset information and time offset (TSF timing offset) of each BSS.

Even when the particular condition is met, the transmission may be performed only a particular minimum time unit after the previous transmission is done, or the transmission may be performed only by an STA designated by the AP. The AP may transmit, to the STAs, signals containing an indicator or information that disables the probe request frame from being transmitted even when the STA is subjected to the determination condition 1802, so as to control the transmission of probe request frames from the STAs.

The neighbor AP might not transmit a probe response frame even when receiving probe request frames from the STAs. Specifically, the neighbor AP may receive the probe request frames at time intervals. The neighbor AP may carry the information requested by the probe request frames received during the time intervals on one probe response frame and may transmit the same to the plurality of STAs having sent the probe request frames after the time intervals. Further, the neighbor AP may send response frames responsive to the probe requests immediately after the reception time intervals are terminated or after a particular time elapses in association with the time intervals of receiving the probe request frames or may send the response frames at other time intervals regardless of the time intervals of receiving the probe request frames. The length of the time intervals of receiving the probe request frames, time intervals in transmission of response frames responsive to the probe requests, and a difference between one time interval and a next time interval may be directly determined using the circumstance of the channel or network estimated or measured by the neighbor AP or may be determined using information exchanged wiredly or wirelessly with other neighbor APs or via signals from the STAs. The time intervals may be set to be different for each AP.

The probe request frame and the probe response frame may be any signals, for example, ANQPs, which may be communicated between the STA and the AP even without any association.

An example of an operational process by the STA in the WLAN system supportive of multiple antennas according to an embodiment of the present disclosure has been described above with reference to FIG. 18. An example of an operational process by an AP in the WLAN system supportive of multiple antennas according to an embodiment of the present disclosure is now described below with reference to FIG. 19.

Figure 19:
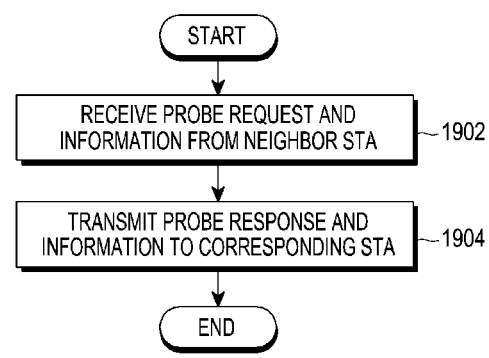
FIG. 19 is a flowchart schematically illustrating an operation of an AP in a WLAN system supportive of multiple antennas according to an embodiment of the present disclosure.

FIG. 19 is a flowchart schematically illustrating an operation of an AP in a WLAN system supportive of multiple antennas according to an embodiment of the present disclosure.

Referring to FIG. 19, first, the antenna receives a probe request frame from a neighbor STA, recognizes that data communication has initiated, and receives the data contained in the probe request frame at operation 1902.

The antenna collects data related to the STA having sent the probe request frame and sends a probe response frame containing the collected data to the STA at operation 1904. The data communicable by the STA and the neighbor AP may include data items enabling the estimation of the degree of interference influencing them, for example, some of an RSSI, an SINR, and a beamforming index. The data may further include data items that may assist in the AP operating resources, including some of, for example, resource reservation data (TXOP reservation info.) of each network, a TBTT, and time of stopping communication for scanning a next channel (Next scanning gap info.). The data may further include data items useful to select variables for changing channels and setting up an environment, including some of, for example, data for grasping the capability of each AP (capability information), load (or queue length) of each AP, number of stations active in the network, and service data supportable by each BSS. The data may further include data items useful to select variables for syncing between the BSSs, including some of, for example, frequency offset information and time offset (TSF timing offset) of each BSS.

Even when such particular condition is met where the STA#1 113 and AP#2 121 start data communication, the transmission may be performed only a particular minimum time unit after the previous transmission is done, or the transmission may be performed only by an STA designated by the AP. The AP may transmit, to the STAs, signals containing an indicator or information that disables the probe request frame from being transmitted even when the STA is encountered with the particular condition, so as to control the transmission of probe request frames from the STAs.

The neighbor AP might not transmit a probe response frame even when receiving probe request frames from the STAs. Specifically, the neighbor AP may receive the probe request frames at time intervals. The neighbor AP may carry the information requested by the probe request frames received during the time intervals on one probe response frame and may transmit the same to the plurality of STAs having sent the probe request frames after the time intervals. Further, the neighbor AP may send response frames responsive to the probe requests immediately after the reception time intervals are terminated or after a particular time elapses in association with the time intervals of receiving the probe request frames or may send the response frames at other time intervals regardless of the time intervals of receiving the probe request frames. The length of the time intervals of receiving the probe request frames, time intervals in transmission of response frames responsive to the probe requests, and a difference between one time interval and a next time interval may be directly determined using the circumstance of the channel or network estimated or measured by the neighbor AP or may be determined using information exchanged wiredly or wirelessly with other neighbor APs or via signals from the STAs. The time intervals may be set to be different for each AP.

The probe request frame and the probe response frame may be any signals, for example, ANQPs, which may be communicated between the STA and the AP even without any association.

An example of an operational process by the AP in the WLAN system supportive of multiple antennas according to an embodiment of the present disclosure has been described above with reference to FIG. 19. Information elements exchangeable by the STA and neighbor AP in the WLAN system supportive of multiple antennas according to an embodiment of the present disclosure are now described below with reference to FIGS. 20 to 21C.

FIGS. 20 to 21C are views schematically illustrating information elements containing data according to an embodiment of the present disclosure.

The information elements shown in FIG. 20 may include various types of information, and the type of such information elements is specified in detail in the IEEE 802.11 standards. The information elements may be carried only on management frame signals. For information exchange as proposed herein, the STAs and the APs may carry the information elements loaded with such information on resource request and resource request response frames.

The present disclosure defines information items that should be exchanged for efficient resource utilization and proposes new information elements that may contain, among the information items, ones not included in the legacy information elements. Examples of some of such new information elements are shown in FIGS. 21A to 21C.

FIG. 21A illustrates information elements by which resource reservation information may be exchanged. Information elements are shown in FIG. 21A for transmitting information on n reserved resources whose basic units are the start time of a reserved resource and the time duration during which the reserved resource is put to use. It should be noted in connection with FIG. 21A that the start time of the reserved resource is denoted as TXOP Start time, and the time duration during which the reserved resource is to be used is denoted as TXOP duration.

The basic units of resource reservation information may come in existence in various manners as follows.

First, information on a reserved resource whose basic units include the start time of the reserved resource and the time duration during which the reserved resource is to be used.

Second, information on a reserved resource whose basic units include the start time of the reserved resource and the end time of use of the reserved resource.

Third, information on a reserved resource whose basic units include the start time of the reserved resource, the time duration during which the reserved resource is to be used, and frequency information to use the reserved resource, for example, information including one or more of the start frequency of a frequency bandwidth, a frequency range, or a channel identity (ID) of the frequency band.

Fourth, information on a reserved resource whose basic units include the start time of the reserved resource, the end time of use of the reserved resource, and frequency information to use the reserved resource, for example, information including one or more of the start frequency of a frequency bandwidth, a frequency range, or a channel ID of the frequency band.

The basic units of the resource reservation information may further include information regarding the period at which same resource reservations occur or a time gap to when a next resource reservation occurs according to the nature of the reserved traffic.

Information elements exchangeable by the STA and the neighbor AP in the WLAN system supportive of multiple antennas according to an embodiment of the present disclosure has been described above in connection with FIGS. 21A to 21C.

The present disclosure defines frames for the AP or STA to request a neighbor AP or STA to collect neighbor AP information and proposes new information elements that may contain, among the information items, ones not included in the legacy information elements. Examples of some of such new information elements are shown in FIG. 22.

FIG. 22 is a view illustrating a structure of a neighbor AP information collecting request frame applied to a communication system according to an embodiment of the present disclosure.

Referring to FIG. 22, one neighbor AP information collection request frame includes at least one information item of information on the number of surplus (or total) antennas, information on the number of surplus (or total) RF chains, information on the number of surplus (or total) modems, the time when information collection may be performed, the time when neighbor AP collection information requested may be received, and an indicator containing the promise that resource collection is requested when there is a surplus antenna, RF chain, or modem. Further, when there is any means enabling the collection of the neighbor AP information and the means is mutually known, information on such means may also be included.

Information elements exchangeable by the STA and the neighbor AP in the WLAN system supportive of multiple antennas according to an embodiment of the present disclosure has been described above in connection with FIG. 22. Internal structures of an STA and an AP communicating data between an STA and a neighbor AP in a WLAN system supportive of multiple antennas according to embodiments of the present disclosure are now described with reference to FIGS. 23 and 24.

Figure 23:
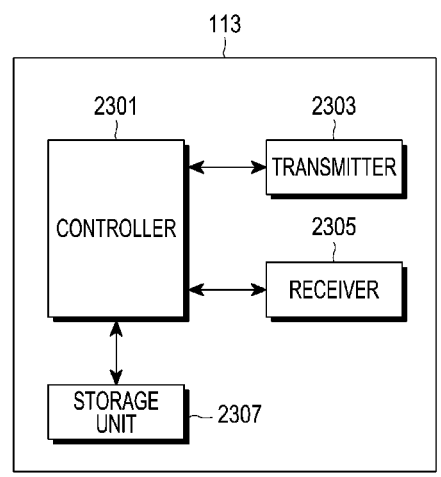
FIG. 23 is a view illustrating an internal configuration of an apparatus for communicating data with a neighbor AP in an STA of a communication system according to an embodiment of the present disclosure.

FIG. 23 is a view illustrating an internal configuration of an apparatus for communicating data with a neighbor AP in an STA of a communication system according to an embodiment of the present disclosure.

Referring to FIG. 23, an STA#1 113 includes a controller 2301, a transmitter 2303, a receiver 2305, and a storage unit 2307.

The controller 2301 controls the overall operation of the STA#1 113, particularly, operations related to data communication according to an embodiment of the present disclosure. The operations related to data communication according to an embodiment of the present disclosure are the same as those described above in connection with the drawings, and no detailed description thereof is repeated.

The transmitter 2303 receives various signals and messages from other entities included in the communication system under the control of the controller 2301. The signals and messages received by the transmitter 2303 are the same as those described above in connection with the drawings, and no detailed description thereof is repeated.

The receiver 2305 receives various signals and messages from other entities included in the communication system under the control of the controller 2301. The signals and messages received by the receiver 2305 are the same as those described above in connection with the drawings, and no detailed description thereof is repeated.

The storage unit 2307 stores programs and various data related to data communication performed by the STA#1 113 under the control of the controller 2301 according to an embodiment of the present disclosure. The storage unit 2307 stores various signals and messages received by the receiver 2305 from other entities.

Although FIG. 23 illustrates that the STA#1 113 includes separate units, such as the controller 2301, the transmitter 2303, the receiver 2305, and the storage unit 2307, the STA#1 113 may be implemented in such a manner that at least two of the controller 2301, the transmitter 2303, the receiver 2305, and the storage unit 2307 are integrated together. Further, the STA#1 113 may be implemented in a single processor.

Figure 24:
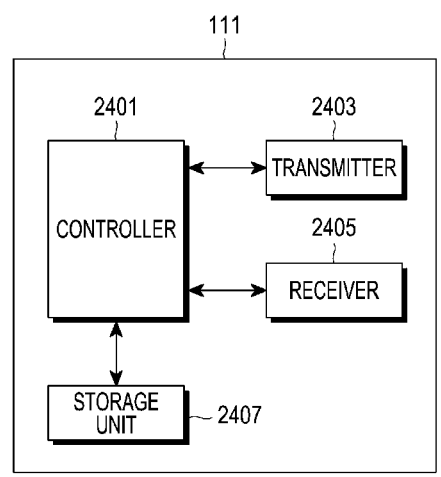
FIG. 24 is a view illustrating an internal configuration of an apparatus for communicating data with an STA in an AP of a communication system according to an embodiment of the present disclosure.

FIG. 24 is a view illustrating an internal configuration of an apparatus for communicating data with an STA in an AP of a communication system according to an embodiment of the present disclosure. The AP of FIG. 24 may perform all of the operations by the AP#1 111 and the AP#2 121 as described above in connection with the embodiments of the present disclosure. Thus, the AP set forth below may be one of the AP#1 111 and the AP#2 121.

Referring to FIG. 24, the AP includes a controller 2401, a transmitter 2403, a receiver 2405, and a storage unit 2407.

The controller 2401 controls the overall operation of the AP, particularly, operations related to data communication according to an embodiment of the present disclosure. The operations related to data communication according to an embodiment of the present disclosure are the same as those described above in connection with the drawings, and no detailed description thereof is repeated.

The transmitter 2403 receives various signals and messages from other entities included in the communication system under the control of the controller 2401. The signals and messages received by the transmitter 2403 are the same as those described above in connection with the drawings, and no detailed description thereof is repeated.

The receiver 2405 receives various signals and messages from other entities included in the communication system under the control of the controller 2401. The signals and messages received by the receiver 2405 are the same as those described above in connection with the drawings, and no detailed description thereof is repeated.

The storage unit 2407 stores programs and various data related to data communication performed by the AP under the control of the controller 2401 according to an embodiment of the present disclosure. The storage unit 2407 stores various signals and messages received by the receiver 2405 from other entities.

Although FIG. 24 illustrates that the AP includes separate units, such as the controller 2401, the transmitter 2403, the receiver 2405, and the storage unit 2407, the AP may be implemented in such a manner that at least two of the controller 2401, the transmitter 2403, the receiver 2405, and the storage unit 2407 are integrated together. Further, the AP may be implemented in a single processor.

Particular aspects of the present disclosure may be implemented in computer-readable codes on a computer-readable recording medium. The computer readable recording medium is a data storage device that may store data readable by a computer system. Examples of the computer readable recording medium may include read only memories (ROMs), random access memories (RAMs), compact disk-ROMs (CD-ROMs), magnetic tapes, floppy disks, optical data storage devices, and carrier waves (such as data transmission over the Internet). The computer readable recording medium may be distributed by computer systems over a network, and accordingly, the computer readable codes may be stored and executed in a distributed manner. Functional programs, codes, and code segments to attain the present disclosure may be readily interpreted by skilled programmers in the art to which the present disclosure pertains.

The apparatuses and methods according to embodiments of the present disclosure may be implemented in hardware, software, or a combination of hardware and software. Such software may be recorded in volatile or non-volatile storage devices, such as ROMs, memories, such as RAMs, memory chips, memory devices, or integrated circuit devices, CDs, DVDs, magnetic disks, magnetic tapes, or other optical or magnetic storage devices while retained in machine (e.g., computer)-readable storage media. The methods according to embodiments of the present disclosure may be implemented by a computer or a portable terminal including a controller and a memory, and the memory may be a machine-readable storage medium that may properly retain program(s) containing instructions for implementing the embodiments of the present disclosure.

Accordingly, the present disclosure encompasses a program containing codes for implementing the device or method set forth in the claims of this disclosure and a machine (e.g., computer)-readable storage medium storing the program. The program may be electronically transferred via any media such as communication signals transmitted through a wired or wireless connection and the present disclosure properly includes the equivalents thereof.

The apparatuses according to embodiments of the present disclosure may receive the program from a program providing device wiredly or wirelessly connected thereto and store the same. The program providing apparatus may include a memory for storing a program including instructions enabling a program processing apparatus to perform a method according to an embodiment of the present disclosure and data necessary for a method according to an embodiment of the present disclosure, a communication unit for performing wired or wireless communication with a graphic processing apparatus, and a controller transmitting the program to the graphic processing apparatus automatically or as requested by the graphic processing apparatus.

As is apparent from the foregoing description, according to an embodiment of the present disclosure, resources may be operated in the WLAN system supportive of multiple antennas.

According to an embodiment of the present disclosure, resources may be operated in such a manner as to prevent collision in the WLAN system supportive of multiple antennas.

According to an embodiment of the present disclosure, resources may be operated in such a manner as to reduce a service delay in the WLAN system supportive of multiple antennas.

According to an embodiment of the present disclosure, resources may be operated in such a manner as to increase radio resource efficacy in the WLAN system supportive of multiple antennas.

According to an embodiment of the present disclosure, different antennas may be operated for different purposes and methods in the WLAN system supportive of multiple antennas, thereby enabling more efficient data collection.

According to an embodiment of the present disclosure, resources may be operated based on the number of antennas used by a signal transmitter in a WLAN system supportive of multiple antennas.

While the present disclosure has been shown and described with reference to various embodiments thereof, will be understood by those skilled in the art that various changes in form and details may be made therein without departing from the spirit and scope of the present disclosure as defined by the appended claims and their equivalents.

What is claimed is:

1. A method for transmitting data by a station (STA) in a communication system, the method comprising:
communicating with a first access point (AP) being present in a first basic service set (BSS) in which the STA is present;
identifying a condition;
receiving, from a second AP positioned adjacent to the STA, data of a second BSS associated with the second AP by using an idle antenna, base-band processing unit, and a modem in a case that the condition is satisfied, wherein the second BSS is different from the first BSS;
transmitting, to the first AP, the data of the second BSS associated with the second AP; and
receiving, from the first AP, mode information related to operation protocols and frequency bands of the first BSS managed by the first AP,
wherein the condition is set based on one of a noise strength estimated by the STA, a network load of the first BSS, and a probability of transmission failure of the STA, and
wherein the mode information is determined based on the data of the second BSS associated with the second AP.

2. The method of claim 1, wherein the communication with the second AP is performed during the communication with the first AP.

3. The method of claim 1, wherein the mode information includes information to change the operation protocols and the frequency bands of the first BSS managed by the first AP, information to add another operation protocol and another frequency band to the operation protocols and the frequency bands of the first BSS managed by the first AP, or information to release a portion of the operation protocols and the frequency bands of the first BSS managed by the first AP.

4. The method of claim 1, wherein the data of the second BSS includes at least one of information element about a received signal strength indicator (RSSI), an SINR, resource reservation data, a time of stopping communication for scanning a next channel, capability information and a queue length of the second AP, a number of stations, service data supportable by the second BSS, a frequency offset, and a time offset of the second BSS.

5. The method of claim 1, wherein the data of the second BSS includes a beamforming index indicating interference estimation.

6. A method for receiving data by a first access point (AP) in a communication system, the method comprising:
communicating with a station (STA) being present in a first basic service set (BSS) in which the first AP is present;
identifying a condition;
receiving, from the STA, data of a second BSS associated with a second AP positioned adjacent to the STA, the data being obtained by using an idle antenna, base-band processing unit, and a modem in a case that the condition is satisfied, wherein the second BSS is different from the first BSS;
identifying mode information based on the data of the second BSS associated with the second AP, the mode information being related to operation protocols and frequency bands of the first BSS managed by the first AP; and
transmitting, to the STA, the mode information,
wherein the condition is set based on one of a noise strength estimated by the STA, a network load of the first BSS, and a probability of transmission failure of the STA.

7. The method of claim 6, wherein communication between the STA and the second AP is performed during communication between the STA and the first AP.

8. The method of claim 6, wherein the mode information includes information to change the operation protocols and the frequency bands of the first BSS managed by the first AP, information to add another operation protocol and another frequency band to the operation protocols and the frequency bands of the first BSS managed by the first AP, or information to release some of the operation protocols and the frequency bands of the first BSS managed by the first AP.

9. The method of claim 6, wherein the data of the second BSS includes at least one of information element about a received signal strength indicator (RSSI), an SINR, resource reservation data, a time of stopping communication for scanning a next channel, a capability information and a queue length of the second AP, a number of stations, service data supportable by the second BSS, a frequency offset, and a time offset of the second BSS.

10. The method of claim 6, wherein the data of the second BSS includes a beamforming index indicating interference estimation.

11. A station (STA) for transmitting data in a communication system, the STA comprising:
a transceiver; and
a processor configured to:
control the transceiver to communicate with a first access point (AP) being present in a first basic service set (BSS) in which the STA is present,
identify a condition,
control the transceiver to receive, from a second AP positioned adjacent to the STA, data of a second BSS associated with the second AP by using an idle antenna, base-band processing unit, and a modem in a case that the condition is satisfied, wherein the second BSS is different from the first BSS,
control the transceiver to transmit, to the first AP, the data of the second BSS associated with the second AP, and
control the transceiver to receive, from the first AP, mode information related to operation protocols and frequency bands of the first BSS managed by the first AP,
wherein the condition is set based on one of a noise strength estimated by the STA, a network load of the first BSS, and a probability of transmission failure of the STA, and
wherein the mode information is determined based on the data of the second BSS associated with the second AP.

12. The STA of claim 11, wherein communication between the STA and the second AP is performed during communication between the STA and the first AP.

13. The STA of claim 11, wherein the mode information includes information to change the operation protocols and the frequency bands of the first BSS managed by the first AP, information to add another operation protocol and another frequency band to the operation protocols and the frequency bands of the first BSS managed by the first AP, or information to release some of the operation protocols and the frequency bands of the first BSS managed by the first AP.

14. The STA of claim 11, wherein the data of the second BSS includes at least one of information element about a received signal strength indicator (RSSI), an SINR, resource reservation data, a time of stopping communication for scanning a next channel, capability information and a queue length of the second AP, a number of stations, service data supportable by the second BSS, a frequency offset, and a time offset of the second BSS.

15. The STA of claim 11, wherein the data of the second BSS includes a beamforming index indicating interference estimation.

16. A first access point (AP) for receiving data in a communication system, the first AP comprising:
a transceiver; and
a processor configured to:
control the transceiver to communicate with a station (STA) being present in a first basic service set (BSS) in which the first AP is present,
identify a condition,
control the transceiver to receive, from the STA, data of a second BSS associated with a second AP positioned adjacent to the STA, the data being obtained by using an idle antenna, base-band processing unit, and a modem in a case that the condition is satisfied, wherein the second BSS is different from the first BSS,
identify mode information based on the data of the second BSS associated with the second AP, the mode information being related to operation protocols and frequency bands of a first BSS managed by the first AP, and
control the transceiver to transmit, to the STA, the mode information,
wherein the condition is set based on one of a noise strength estimated by the STA, a network load of the first BSS, and a probability of transmission failure of the STA.

17. The first AP of claim 16, wherein communication between the STA and the second AP is performed during communication between the STA and the first AP.

18. The first AP of claim 16, wherein the mode information includes information to change the operation protocols and the frequency bands of the first BSS managed by the first AP, information to add another operation protocol and another frequency band to the operation protocols and the frequency bands of the first BSS managed by the first AP, or information to release some of the operation protocols and the frequency bands of the first BSS managed by the first AP.

19. The first AP of claim 16, wherein the data of the second BSS includes at least one of information element about a received signal strength indicator (RSSI), an SINR, resource reservation data, a time of stopping communication for scanning a next channel, capability information and a queue length of the second AP, a number of stations, service data supportable by the second BSS, a frequency offset, and a time offset of the second BSS.

20. The first AP of claim 16, wherein the data of the second BSS includes a beamforming index indicating interference estimation.

* * * * *